(12) United States Patent
Chavan Dafle et al.

(10) Patent No.: US 12,521,888 B2
(45) Date of Patent: Jan. 13, 2026

(54) SYNERGIES BETWEEN PICK AND PLACE: TASK-AWARE GRASP ESTIMATION

(71) Applicant: SAMSUNG ELECTRONICS CO., LTD., Suwon-si (KR)

(72) Inventors: Nikhil Narsingh Chavan Dafle, Jersey City, NJ (US); Vasileios Vasilopoulos, Woodbridge, NJ (US); Shubham Agrawal, Jersey City, NJ (US); Jinwook Huh, Millburn, NJ (US); Suveer Garg, New York, NY (US); Pedro Piacenza, Jersey City, NJ (US); Isaac Hisano Kasahara, Brooklyn, NY (US); Kazim Selim Engin, Weehawken, NJ (US); Zhanpeng He, New York, NY (US); Shuran Song, New York, NY (US); Ibrahim Volkan Isler, Saint Paul, MN (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 158 days.

(21) Appl. No.: 18/367,827

(22) Filed: Sep. 13, 2023

(65) Prior Publication Data

US 2024/0091951 A1 Mar. 21, 2024

Related U.S. Application Data

(60) Provisional application No. 63/452,620, filed on Mar. 16, 2023, provisional application No. 63/450,908, (Continued)

(51) Int. Cl.
B25J 9/16 (2006.01)
G06T 7/60 (2017.01)
G06T 7/73 (2017.01)

(52) U.S. Cl.
CPC ........... *B25J 9/1697* (2013.01); *B25J 9/1612* (2013.01); *B25J 9/163* (2013.01); *G06T 7/60* (2013.01);
(Continued)

(58) Field of Classification Search
CPC ........ B25J 9/1697; B25J 9/1612; B25J 9/163; G06T 7/60; G06T 7/73;
(Continued)

(56) References Cited

U.S. PATENT DOCUMENTS 7,859,540 B2 12/2010 Dariush
9,616,568 B1 4/2017 Russell
(Continued)

FOREIGN PATENT DOCUMENTS

CA 3203956 A1 6/2022
EP 2 952 301 B1 12/2019
(Continued)

OTHER PUBLICATIONS

International Search Report (PCT/ISA/210) issued on Dec. 13, 2023 by the International Searching Authority for International Patent Application No. PCT/KR2023/013966.
Communication issued Jun. 26, 2025 by the European Patent Office in European patent Application No. 23865911.4.
(Continued)

*Primary Examiner* — Dylan M Katz
(74) *Attorney, Agent, or Firm* — Sughrue Mion, PLLC

(57) ABSTRACT

Systems, methods, and apparatuses for controlling a robot including a manipulator, including: determining three-dimensional (3D) geometry information about a target object based on an image of the target object; determining 3D geometry information about a scene in which the target object is to be placed based on at least one image of the scene; obtaining affordance information by providing the 3D
(Continued)

geometry information about the target object and the 3D geometry information about the scene to at least one neural network model; commanding the robot to grasp the target object using the manipulator according to a grasp orientation corresponding to the affordance information; and commanding the robot to position the manipulator according to a placement direction corresponding to the affordance information in order to place the target object at a location in the scene.

20 Claims, 13 Drawing Sheets

Related U.S. Application Data filed on Mar. 8, 2023, provisional application No. 63/406,853, filed on Sep. 15, 2022.

(52) U.S. Cl.
CPC ...... *G06T 7/73* (2017.01); *G06T 2207/10024* (2013.01); *G06T 2207/10028* (2013.01); *G06T 2207/20081* (2013.01); *G06T 2207/20084* (2013.01)

(58) Field of Classification Search
CPC ................................ G06T 2207/10024; G06T 2207/10028; G06T 2207/20081; G06T 2207/20084; G05B 2219/39484; G05B 2219/39536; G05B 2219/39543; G05B 2219/40564
See application file for complete search history.

(56) References Cited

U.S. PATENT DOCUMENTS

| | | |
|---|---|---|
| 9,987,746 B2 | 6/2018 | Bradski et al. |
| 10,131,051 B1* | 11/2018 | Goyal .................... B25J 9/1697 |
| 11,559,885 B2 | 1/2023 | Humayun et al. |
| 11,597,078 B2 | 3/2023 | Yang et al. |
| 2019/0022863 A1 | 1/2019 | Kundu et al. |
| 2022/0168899 A1 | 6/2022 | Boroushaki et al. |
| 2022/0391638 A1 | 12/2022 | Fan |
| 2022/0392162 A1 | 12/2022 | Shen et al. |
| 2024/0335941 A1* | 10/2024 | Aparicio Ojea ....... B25J 9/1697 |

FOREIGN PATENT DOCUMENTS

| | | |
|---|---|---|
| JP | 2021-61014 A | 4/2021 |
| KR | 10-2067878 B1 | 1/2020 |
| WO | 2021/198053 A1 | 10/2021 |
| WO | 2021/206671 A1 | 10/2021 |
| WO | 2022/119962 A1 | 6/2022 |

OTHER PUBLICATIONS

Manuelli, Lucas et al., "kPAM: KeyPoint Affordances for Category-Level Robotic Manipulation", arXiv:1903.06684v2 [cs.RO], Oct. 29, 2019. (26 pages total).

Deng, Yuhong et al., "Deep Reinforcement Learning for Robotic Pushing and Picking in Cluttered Environment", 2019 IEEE/RSJ International Conference on Intelligent Robots and Systems (IROS), Macau, China, Nov. 4-8, 2019, pp. 619-626. (8 pages total).

Danielczuk, Michael et al., "Object Rearrangement Using Learned Implicit Collision Functions", arXiv:2011.107261 [cs.RO], Nov. 21, 2020. (8 pages total).

* cited by examiner

SYNERGIES BETWEEN PICK AND PLACE: TASK-AWARE GRASP ESTIMATION

CROSS-REFERENCE TO RELATED APPLICATION(S)

This application is based on and claims priority under 35 U.S.C. § 119 to U.S. Provisional Patent Application No. 63/406,853 filed on Sep. 15, 2022, U.S. Provisional Patent Application No. 63/450,908 filed on Mar. 8, 2023, and U.S. Provisional Patent Application No. 63/452,620 filed on Mar. 16, 2023, in the U.S. Patent & Trademark Office, the disclosures of which are incorporated herein by reference in their entireties.

BACKGROUND

1. Field

The disclosure relates to an apparatus and a method for robot motion control, and more particularly, for task-dependent grasp planning for object grasping and placement tasks.

2. Description of Related Art

In robot motion control, picking objects and placing objects are two fundamental skills that enable diverse robotic manipulation tasks. However, not all grasps which may be used by a robot to pick an object may be useful for the desired task. For example, a task of placing an object in a particular scene may constrain the suitable grasps on the object.

Generally, these two skills have been explored independently. For example, different approaches, ranging from hardware design and physics-based computational tools to some recent learning-based methods, have been explored for object picking, which may refer to generating and facilitating grasps on objects in a scene with six degrees of freedom (6DoF). Separate approaches have been explored for the task of placing a grasped object, while considering the geometry of the object and the environment.

Considering object picking and object placing as independent problems may provide conveniences, for example a reduction in the action search space, and build robust algorithms. However, estimating a grasp of an object without considering the downstream task, for example placing the object, can result in grasps which are infeasible for the task.

Recent approaches which consider the implications of grasps on the downstream tasks may involve placing and regrasping the object, for example by learning object reorientations which may be used for successful placement. Other approaches may use constrained action space, for example by limiting tasks to two-dimensional top-down placement, or may use expensive supervision, for example expert demonstration on every task.

However, such approaches may have limited suitability for 6DoF pick-and-place tasks, or for tasks involving novel objects and novel scenes.

SUMMARY

One or more embodiments of the present disclosure provide task-aware grasp planning for object grasping and placement tasks.

According to an aspect of the disclosure, an electronic device for controlling a robot including a manipulator includes: one or more processors configured to: determine three-dimensional (3D) geometry information about a target object based on an image of the target object; determine 3D geometry information about a scene in which the target object is to be placed based on at least one image of the scene; obtain affordance information by providing the 3D geometry information about the target object and the 3D geometry information about the scene to at least one neural network model; command the robot to grasp the target object using the manipulator according to a grasp orientation corresponding to the affordance information; and command the robot to position the manipulator according to a placement direction corresponding to the affordance information in order to place the target object at a location in the scene.

The one or more processors may be further configured to: determine a plurality of candidate grasp orientations for grasping the target object based on the 3D geometry information about the target object; determine a plurality of candidate placement directions for placing the target object in the scene based on the 3D geometry information about the scene; obtain a plurality of affordance maps by providing information about the plurality of candidate grasp orientations and information about the plurality of candidate placement directions to the at least one neural network model, wherein each affordance map from among the plurality of affordance maps corresponds to a candidate grasp orientation from among the plurality of candidate grasp orientations and a candidate placement direction from among the plurality of candidate placement directions; and select an affordance map from among the plurality of affordance maps, wherein the affordance information corresponds to the selected affordance map.

The at least one neural network model may include: an object encoder configured to output a plurality of object encodings corresponding to the plurality of candidate grasp orientations based on the 3D geometry information about the target object; a scene encoder configured to output a plurality of scene encodings corresponding to the plurality of candidate placement directions based on the 3D geometry information about the scene; and an affordance decoder configured to output the plurality of affordance maps based on the plurality of object encodings and the plurality of scene encodings.

The object encoder, the scene encoder, and the affordance decoder may be jointly trained.

The affordance map may include a plurality of pixels corresponding to a plurality of affordance values, and each affordance value from among the plurality of affordance values may indicate a probability of success for placing the target object.

The affordance map may be selected based on the plurality of pixels including a highest affordance value from among all affordance values associated with the plurality of affordance maps.

The electronic device may further include at least one camera configured to capture the image of the target object and the at least one image of the scene.

The image of the target object may be a depth image, and the at least one image of the scene may be a color image.

The one or more processors may be configured to command the robot to position the manipulator by computing a proposed trajectory based on the placement direction, and generating a velocity command corresponding to the proposed trajectory.

According to an aspect of the disclosure, a method for controlling a robot including a manipulator includes: determining three-dimensional (3D) geometry information about a target object based on an image of the target object; determining 3D geometry information about a scene in which the target object is to be placed based on at least one image of the scene; obtaining affordance information by providing the 3D geometry information about the target object and the 3D geometry information about the scene to at least one neural network model; commanding the robot to grasp the target object using the manipulator according to a grasp orientation corresponding to the affordance information; and commanding the robot to position the manipulator according to a placement direction corresponding to the affordance information in order to place the target object at a location in the scene.

The method may further include: determining a plurality of candidate grasp orientations for grasping the target object based on the 3D geometry information about the target object; determining a plurality of candidate placement directions for placing the target object in the scene based on the 3D geometry information about the scene; obtaining a plurality of affordance maps by providing information about the plurality of candidate grasp orientations and information about the plurality of candidate placement directions to the at least one neural network model, wherein each affordance map from among the plurality of affordance maps corresponds to a candidate grasp orientation from among the plurality of candidate grasp orientations and a candidate placement direction from among the plurality of candidate placement directions; and selecting an affordance map from among the plurality of affordance maps, wherein the affordance information corresponds to the selected affordance map.

The at least one neural network model may include: an object encoder configured to output a plurality of object encodings corresponding to the plurality of candidate grasp orientations based on the 3D geometry information about the target object; a scene encoder configured to output a plurality of scene encodings corresponding to the plurality of candidate placement directions based on the 3D geometry information about the scene; and an affordance decoder configured to output the plurality of affordance maps based on the plurality of object encodings and the plurality of scene encodings.

The object encoder, the scene encoder, and the affordance decoder may be jointly trained.

The affordance map may include a plurality of pixels corresponding to a plurality of affordance values, and each affordance value from among the plurality of affordance values may indicate a probability of success for placing the target object.

The affordance map may be selected based on the plurality of pixels including a highest affordance value from among all affordance values associated with the plurality of affordance maps.

The method may further include capturing the image of the target object and the at least one image of the scene.

The image of the target object may be a depth image, and the at least one image of the scene may be a color image.

The commanding the robot to position the manipulator may include computing a proposed trajectory based on the placement direction, and generating a velocity command corresponding to the proposed trajectory.

According to an aspect of the disclosure, a non-transitory computer-readable medium stores instructions which, when executed by at least one processor of a device for controlling a robot including a manipulator, cause the at least one processor to: determine three-dimensional (3D) geometry information about a target object based on an image of the target object; determine 3D geometry information about a scene in which the target object is to be placed based on at least one image of the scene; obtain affordance information by providing the 3D geometry information about the target object and the 3D geometry information about the scene to at least one neural network model; command the robot to grasp the target object using the manipulator according to a grasp orientation corresponding to the affordance information; and command the robot to position the manipulator according to a placement direction corresponding to the affordance information in order to place the target object at a location in the scene.

The instructions may further cause the at least one processor to: determine a plurality of candidate grasp orientations for grasping the target object based on the 3D geometry information about the target object; determine a plurality of candidate placement directions for placing the target object in the scene based on the 3D geometry information about the scene; obtain a plurality of affordance maps by providing information about the plurality of candidate grasp orientations and information about the plurality of candidate placement directions to the at least one neural network model, wherein each affordance map from among the plurality of affordance maps corresponds to a candidate grasp orientation from among the plurality of candidate grasp orientations and a candidate placement direction from among the plurality of candidate placement directions; and select an affordance map from among the plurality of affordance maps, wherein the affordance information corresponds to the selected affordance map.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

Figure 1A:
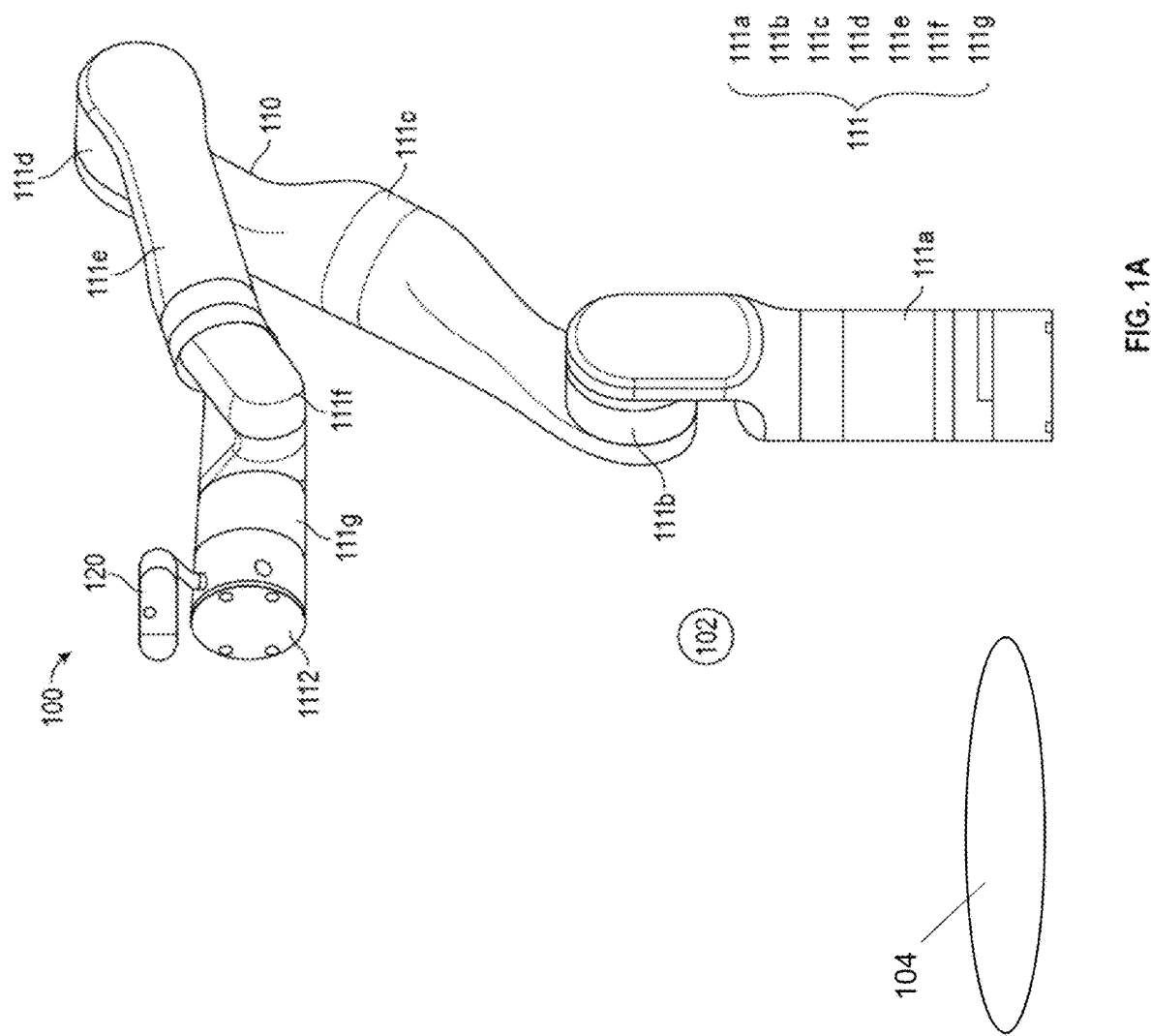
FIGS. 1A-1B are block diagrams of a configuration of a system for controlling a robot including a manipulator, according to embodiments of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

The term "module" or "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

One or more embodiments of the present disclosure provide an apparatus and a method for controlling a robot including a manipulator. For example, embodiments may take advantage of synergy between object picking and object placing in a cluttered scene to develop a framework for task-aware grasp estimation. Embodiments may relate to an object-centric action space parameterized by the object transformation required for placement and the placement direction. For example, the object-centric action space may be presented that encodes the matching between the geometry of the placement scene and the object to be placed, to provide placement affordance maps directly from the perspective views of the placement scene. This action space may provide a one-to-one mapping between the placement action and the picking action, which may allow a robot or other electronic device to generate diverse set of pick-and-place proposals, and to optimize for one under other task constraints such as robot kinematics, collision avoidance, etc. Accordingly, this action space may allow a robot or other electronic device to establish the correspondence between the picking grasp and the placement pose, naturally providing a method to guide the grasp selection for desired placement and vice versa. Based on results of simulations and experiments using a real robot, embodiments may allow a robot to successfully complete the task of placement-aware grasping with more than 85% accuracy, and generalize over novel objects and scenes.

Task-dependent grasp planning may involve reasoning about several different problems. One such problem may be placement estimation, and may involve determining where and how an object can be placed in a cluttered scene, by taking into account the geometry of the object and the geometry of the cluttered scene. Another problem may be dense placement affordance prediction, which may involve multiple diverse solutions for placement estimation for a robot to optimize for the placement considering motion planning or other task constraints. Yet another problem may be grasp selection, which may involve selecting an appropriate grasp on an object which allows for the estimated object placement.

Embodiments may assist in solving the problems discussed above by addressing the dependency between grasping and placing to perform placement-aware grasp estimation. For example, a robot or other electronic device may not observe and perceive the empty space to place the objects directly in captured images. Therefore, embodiments may relate to rendering a virtual view of the placement scene from a virtual or imaginary camera, for example a camera having a view from the perspective or viewing direction of the manipulator used to perform the pick-and-place task. Therefore, the view direction of this virtual view may match the direction used for object placement. For example, embodiments may use a Neural Radiance Field (NeRF) model to generate this virtual view from a relatively few images captured by the robot. This virtual view may be used to find a location to place the object in the scene.

In addition, embodiments may use a neural network which is trained to estimate dense object placement affordance value for each pixel in a rendered image corresponding to the virtual view for different orientations of the object to be placed. The affordance value may indicate the probability of success if the object is placed at the location of each pixel in the image. Higher affordance value indicates the higher chance of success. In embodiments, this rendered image may be referred to as an affordance map.

According to embodiments, an object may be placed in a cluttered scene in different orientations, and the placement affordance value may change based on the object orientation. We correlate an object grasp to object placement orientation to develop an overall integrated method to generate grasp proposals on an object, estimate dense placement affordance values when using different grasp proposals and placement directions. For example, embodiments may involve the creation of multiple affordance maps, each of which may correspond to a particular candidate grasp orientation and a particular placement direction which may be used to place the object. Then, a maximum affordance value may be selected in order to optimize the grasp orientation and placement direction used to perform the pick-and-place task.

As a result, embodiments may be used to enable a robot or other electronic device to perform pick-and-place tasks on objects in a cluttered scene. For example, embodiments may allow a robot or other electronic device to reason about the potential use of a chosen grasp to achieve the desired placement in a cluttered scene, and then choose a most suitable grasp orientation and placement direction to accomplish the pick-and-place task.

Various embodiments of the present disclosure will be described with reference to the drawings below.

Figure 1B:
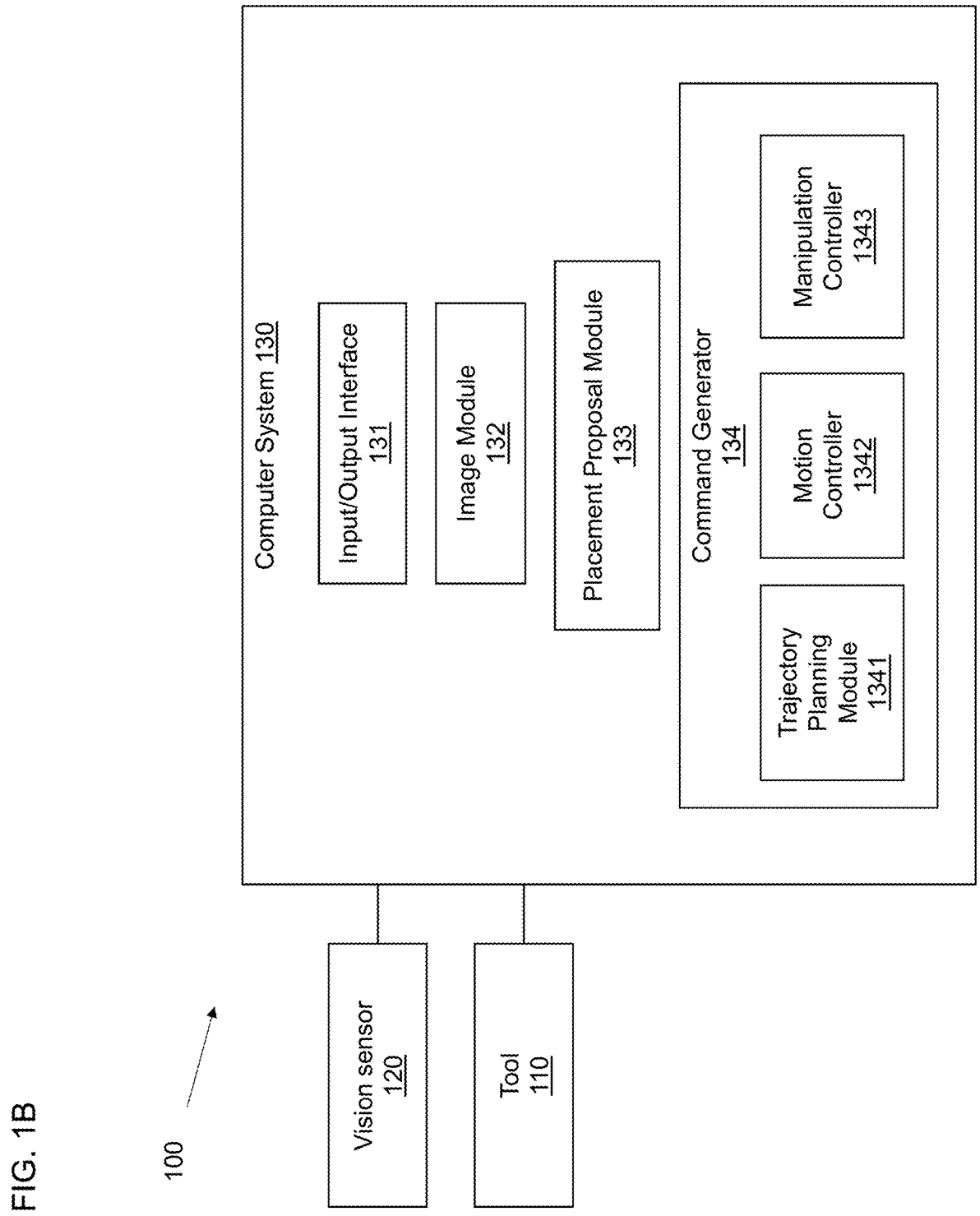

FIGS. 1A-1B are block diagrams of a configuration of a system for controlling a robot including a manipulator, in accordance with embodiments.

As shown in FIGS. 1A and 1B, an apparatus 100 according to embodiments may include a tool 110, a vision sensor 120, and a computer system 130. The computer system 130 may include an input/output interface 131, an image module 132, a placement proposal module 133, and a command generator 134. In embodiments, the command generator 134 may include a trajectory planning module 1341, a motion controller 1342, and a manipulation controller 1343.

The apparatus 100 may receive a task to be performed on a target object 102, and may estimate a movement path (i.e., trajectory) of the tool 110 to perform the task. For example, the apparatus 100 may train the placement proposal module 133 that accepts as input an image of the target object 102 and a scene 104 into which the target object 102 is to be placed, and generates as output an affordance map which corresponds to a grasp orientation for the tool 110 to grasp the target object 102, and a placement direction for placing the target object 102 at a location in the scene 104. At least one of the affordance map, the grasp orientation, and the placement direction may then be used by the command generator 134 to generate a command for controlling the tool 110. In embodiments, the affordance map may be selected from among a plurality of candidate affordance maps generated by the placement proposal module 133, and each candidate affordance map may correspond to a particular candidate grasp orientation and a particular candidate placement direction.

Hereinafter, the elements of the apparatus 100 are described in further detail.

The tool 110 may be operated under the control of the computer system 130 to manipulate the target object 102. In embodiments, the tool 110 may be a robot arm having a manipulator 112 positioned at one end thereof. The manipulator 112 may include a device such as an end-effector for interacting with the target object 102. Examples of the end-effector may include grippers, scoops, tweezers, force-torque sensors, material removal tools, welding torches, collision sensors, and tool changers, and the types of the end-effector are not limited thereto. Examples of the target object 102 to be manipulated by the tool 110 may include a hook, a cup, a container, a bag, and the like. For example, when a gripper of a robot arm is used as the manipulator 112, the manipulation controller 1343 may control the gripper to grasp the target object 102.

In embodiments, the tool 110 may include one or more joints 111. For example, the joints 111 may include a joint 111a, a joint 111b, a joint 111c, a joint 111d, a joint 111e, a joint 111f, and a joint 111g, each of which may be located at different positions along the tool 110. In embodiments, the tool 110 may move the manipulator 112 to a desired position in space by rotating, moving, or otherwise operating at least one of the joints 111. For example, based on a trajectory generated by the trajectory planning module 1341, the motion controller 1342 may compute joint angles or velocity commands for controlling the joints 111 which may cause the vision sensor 120 to be moved a particular position, and the tool 110 may rotate the joints 111 according to the calculated joint angles or velocity commands. For example, when a gripper of a robot arm is used as the manipulator 112, the particular position may be at least one of a position that is suitable for grasping the target object 102 by the gripper, and a position that is suitable for placing the target object 102 in the scene 104.

The vision sensor 120 may include one or more cameras, and may be configured to capture images of at least one of the tool 110, the target object 102, and the scene 104 in which the target object 102 is to be placed. For example, in embodiments the vision sensor 120 may be attached to the robot arm such that the vision sensor 120 is located at a fixed position with respect to the manipulator 112, and therefore the vision sensor 120 may be moved by the robot arm along with the manipulator 112 according to the movements of the joints 111. The vision sensor 120 may be implemented as or include at least one of an red/green/blue (RGB) camera and an RGB depth (RGBD) camera, however embodiments are not limited thereto.

The image module 132 may control the vision sensor 120 to obtain the images discussed above, and may provide the images to the placement proposal module 133. In embodiments, the image module 132 may perform processing on the images. For example, in some embodiments the image module 132 may obtain depth information based on multiple RGB images of the target object 102 or the scene 104, and may provide the depth information to the placement proposal module 133.

The input/output interface 131 may enable communications between the tool 110, the vision sensor 120, and the computer system 130. The input/output interface 131 may include a transceiver and/or a separate receiver and transmitter that enables the computer system 130 to communicate with other devices, such as via a wired connection, a wireless connection, or a combination of wired and wireless connections. The input/output interface 131 may permit the computer system 130 to receive information from another device and/or provide information to another device. For example, the input/output interface 131 may include an Ethernet interface, an optical interface, a coaxial interface, an infrared interface, a radio frequency (RF) interface, a universal serial bus (USB) interface, a Wi-Fi interface, a cellular network interface, or the like. In embodiments, the computer system 130 may be included in another element such as the tool 110 or the manipulator 112, or may be separate from and external to the other elements of the apparatus 100.

The image module 132, the placement proposal module 133, and the command generator 134 may be implemented by at least one processor and at least one memory.

The processor may be implemented in hardware, firmware, or a combination of hardware and software. The processor may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor may include one or more processors capable of being programmed to perform a function. The processor may access the memory and execute computer readable program instructions that are stored in the memory.

The memory may store information, data, an operating system, a plurality of program modules related to the operation and use of the apparatus 100. For example, the memory may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. The memory may include program instructions and codes configured to be executed by the processor to perform the operations of the image module 132, the placement proposal module 133, and the command generator 134.

Figure 2:
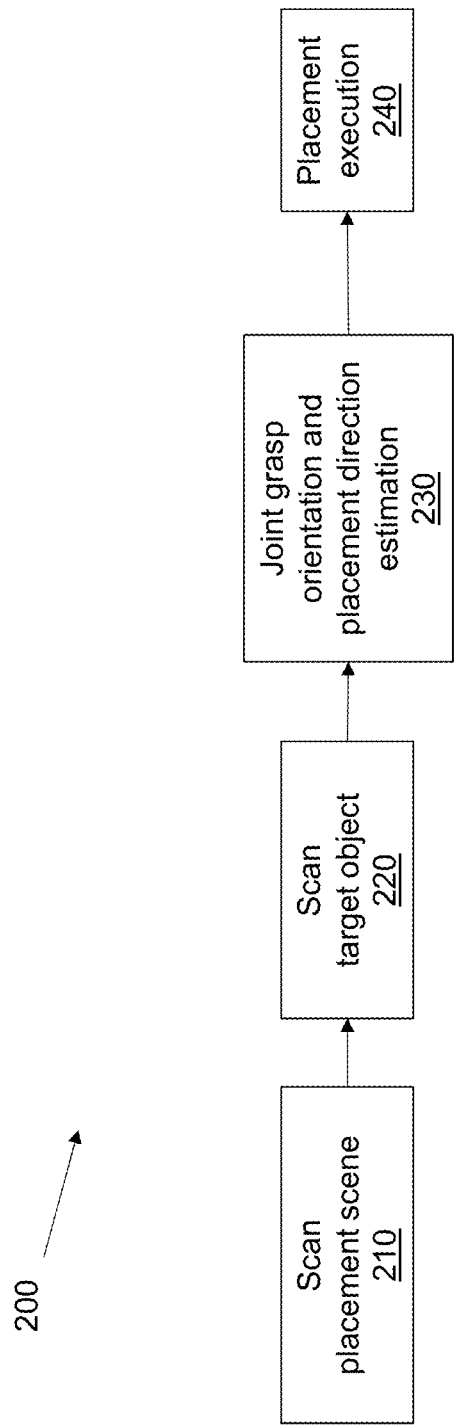
FIG. 2 illustrates a process of controlling a robot including a manipulator, according to embodiments of the present disclosure.

FIG. 2 illustrates a process of controlling a robot including a manipulator, according to embodiments of the present disclosure. In embodiments, the operations illustrated in FIG. 2 may be performed using any element described herein, for example the apparatus 100 or any element thereof.

As shown in FIG. 2, the process 200 may include scanning the scene 104 at operation 210, and scanning the target object 102 at operation 220. In embodiments, the scanning may refer to or include obtaining images using the vision sensor 120. For example, at operation 210 the vision sensor 120 may obtain one or more images of the scene 104 using an RGB camera, and at operation 220 the vision sensor 120 may obtain an image of the target object 102 using an RGBD camera.

As further shown in FIG. 2, at operation 230 the process 200 may include jointly estimating a grasp proposal for grasping the target object 102, and a placement direction for placing the target object 102 in the scene 104. For example, the grasp orientation and the placement direction may be determined based on affordance information which is generated by the placement proposal module 133 based on 3D geometry information about the target object 102 and 3D geometry information about the scene 104 which are generated based on the images obtained in operation 210 and operation 220. In embodiments, the placement proposal module 133 may select the affordance information from among a plurality of pieces of affordance information which are generated based on a plurality of candidate grasp orientations and a plurality of candidate placement directions. Examples of estimating the grasp proposal and the placement direction are provided below with respect to FIGS. 3 to 5 and 6A to 6D.

As further shown in FIG. 2, at operation 240 the process 200 may include placing the target object 102 at a location in the scene 104. For example, the manipulation controller 1343 may control the manipulator 112 to grasp the target object 102 based on the grasp orientation, the trajectory planning module 1341 may generate a proposed trajectory based on the placement direction, the motion controller 1342 may control the tool 110 to operation the joints 111 to place the target object at the location in the scene 104 based on the proposed trajectory, and the manipulation controller 1343 may control the manipulator 112 to release the target object 102.

In embodiments, the pick-and-place action may be formulated as learning placement actions $a_t$ from observations $o_t$ according to Equation 1 and Equation 2 below:

$$\pi(o_t)=a_t \in A \qquad \text{Equation 1}$$

$$a_t=\{T_{pick}, T_{place}\} \qquad \text{Equation 2}$$

In Equation 1 and Equation 2, $\pi$ may denote a function to select a robot action $a_t$ (for example a placement action) given an observation $o_t$. In some implementations, the action space A may be parameterized by $\{T_{pick}, T_{place}\}$, where $T_{pick}$ may denote the pose of an end-effector when grasping an object and $T_{place}$ may denote the pose of the end-effector when releasing the grasp. Parameterizing the pick and place action as two poses of the end-effector allows for designing efficient algorithms to learn spatial action maps in 3D. With this parameterization, $T_{pick}$ and $T_{place}$ may be implicitly correlated, because both actions together can be used to decide the object pose $T_{object}$ for placing the object. Therefore, in order to learn the full pick-and-place task, these approaches may involve inherently learning a pattern matching between the target object and the scene from the poses of the end-effector.

According to embodiments of the present disclosure, the synergies between picking and placing may be leveraged, and the action space may be explicitly parameterized in an object-centric manner according to Equation 3 and Equation 4 below:

$$a_t=\{T_{pick}, T_{object}, a_{insert}\} \qquad \text{Equation 3}$$

$$T_{pick}=f_p(T_{object}, a_{insert}) \qquad \text{Equation 4}$$

In Equation 3 and Equation 4, $T_{pick}$ may denote the pose of an end-effector of the manipulator 112 when grasping the target object 102, $T_{object}$ may denote the pose of the end-effector of the manipulator 112 when placing the target object 102, $a_{insert}$ may denote the direction of a translation action of the end-effector of the manipulator 112 to reach $T_{object}$, and $f_p$ may denote a function that maps a placement action to a picking action. According to this object-centric parameterization, if two of the three actions can be computed, the rest may be inferred, for example by making an assumption that the normal direction aligns with $a_{insert}$.

Therefore, if an optimal placement action $a_t=\{T_{object}, a_{insert}\}$ is found, a grasp orientation can be inferred that is suitable for this placement. As a result, the inferred grasp orientation may be downstream-task aware. In one embodiment of our method, OurNet, focus on learning directly from the downstream task placing action space $a_{place}=\{T_{object}, a_{insert}\}$, then infer task-aware grasps. An example of a conversion between placing actions and picking actions is discussed below.

According to embodiments, actions may be learned in a special Euclidean group 3 (SE(3)) action space for both the picking action and the placing action. This may be challenging because of the high dimensional action space. In general, applying a spatial action map in the SE(3) action space may not be straightforward due to the difficulty of aligning 3D spatial information with the action space.

To address this problem, object-centric perspective spatial action maps may be learned. For example, affordance maps may be produced according to placement directions $a_{insert}$ and object orientations $R_{object}$. In embodiments, the pixels of each affordance map may represent the scores for placing actions performed at the locations of the pixels using the specific object orientation $R_{object}$ and the specific placement direction $a_{insert}$ corresponding to the affordance map.

In embodiments, this may be achieved by integrating a Neural Radiance Field (NeRF) into spatial action map learning. For example, NeRF may be used as a scene representation and also a neural renderer to provide perspective information that aligns with the action space. In embodiments, the scene 104 may be represented as a NeRF by optimizing a Depth-Supervised NeRF (DS-NeRF) model. To provide the spatial alignment, when evaluating the action scores for $a_{insert}$, a depth image may be rendered using the optimized NeRF model from viewing direction $d=a_{insert}$, and the depth image may be encoded using a scene encoder p. The NeRF may provide advantages in that it may provide a clean way to compute the Cartesian position in a world frame because the camera pose of each rendered images may be known, and because it maintains 3D geometry information that may be used for placing.

Then, each placing action may be seen as a pattern matching problem between the 3D geometry information about the target object 102 and 3D geometry information about the scene 104. To evaluate different orientations of the target object 102, a truncated signed distance function (TSDF) may be used as 3D geometry information which represents the target object 102. In embodiments, a TSDF may refer to a 3D voxel array representing objects within a volume of space in which each voxel is labeled with the distance to the nearest surface. For example, the TSDF may correspond to or represent a shell reconstruction of the target object 102. The TSDF may be rotated to obtain a specific object orientation $R_{object}$. Then, the rotated TSDF may be encoded using an object encoder q to produce kernels that may be used to cross-relate object information and scene information. However, embodiments are not limited thereto, and in embodiments the 3D geometry of the target object 102 may be represented using other methods, for example by generating a 3D pointcloud corresponding to the target object 102.

In embodiments, a place model $f_v$ according to embodiments may be an action value function that includes three components. The first component may include a NeRF model that encapsulates 3D geometry information about a cluttered scene, for example the scene 104, and may be used for rendering a virtual view of the scene 104 from a particular perspective or viewing direction to provide scene information, and a scene encoder p, which may encode the scene information to obtain scene encodings. The second component may represent the target object 102 using TSDF, and may encode the TSDF using an object encoder, for example the object encoder q, to produce image kernels. The third component may be used to cross-relate the object encoding and the scene encoding to produce an action map, which may be referred to for example as an affordance map. To derive an optimized placement, different actions may be sampled and fed forward to produce a set of action maps, and the argmax of the action maps may be taken according to Equation 5 and Equation 6 below:

$$\pi(o_t) = a_t = \underset{a_{place}}{\text{argmax}} \, f_v(o_t, a_{place}) \quad \text{Equation 5}$$

$$a_{place} = \{u, v, R_{object}, a_{insert}\} \quad \text{Equation 6}$$

In Equation 5 and Equation 6, u and 9 may denote a pixel location for an object placement position, for example in the NeRF rendered image, and $f_v$ may denote a function to generate placement affordance value given an observation $o_t$ and placement action $a_{place}$. For the grasp action $T_{pick}$, one way to compute feasible placement is by sampling different insertion directions $a_{insert}$. Assuming a grasp action is successful, and that the end-effector of the manipulator 112 is fixed with the target object 102, the orientation can be estimated by applying the difference between $a_{insert}$ and $T_{pick}$ to the object pose.

Figure 3:
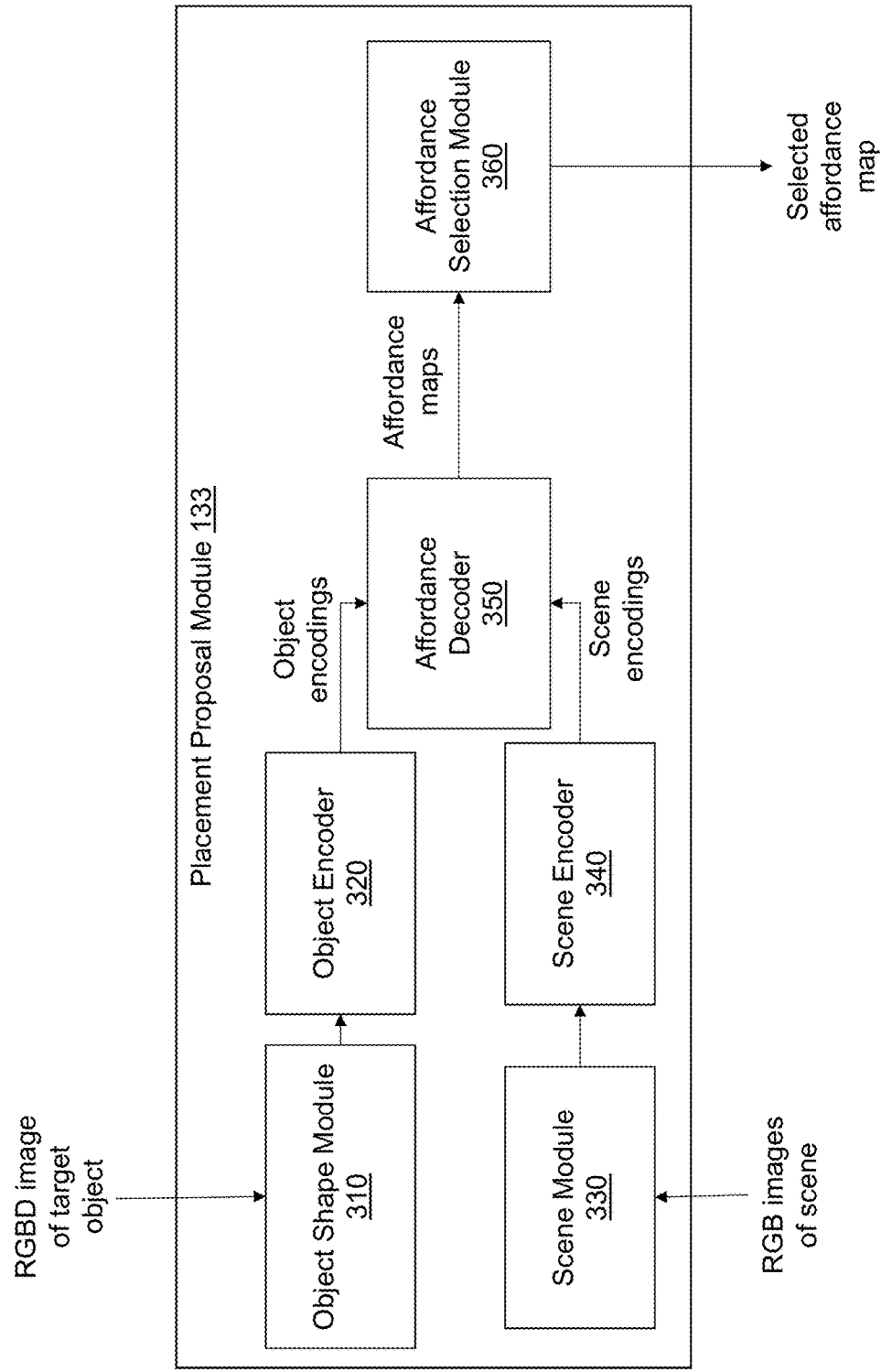
FIG. 3 is a block diagram of an example of a placement proposal module, according to embodiments of the present disclosure.

FIG. 3 is a block diagram of an example of a placement proposal module, according to embodiments of the present disclosure. As shown in FIG. 3, the placement proposal module 133 may include an object shape module 310, an object encoder 320, a scene module 330, a scene encoder 340, an affordance decoder 350, and an affordance selection module 360. In embodiments, the placement proposal module 133 may receive as inputs one or more images, for example an RGBD image of the target object 102 and at least one RGB image of the scene 104, and may output a selected affordance map.

In embodiments, the object shape module 310 and the object encoder 320 may correspond to the second component of the place model $f_v$ discussed above. For example, the object encoder 320 may correspond to the object encoder q discussed above. In embodiments, the object shape module 310 may be referred to as a shell reconstruction module. The object shape module may 310 may receive as input the RGBD image of the target object 102, and may output a TSDF of the shell reconstruction of the target object 102, as discussed above. The object encoder 320 may receive as input the TSDF and a sample object orientation, for example the object orientation $R_{object}$ discussed above, and may output an object encoding corresponding to the rotated object geometry. In embodiments, the object encoder 320 may be an artificial intelligence or machine learning model such as a neural network model, and the object encoding may be a feature vector.

In embodiments, the scene module 330 and the scene encoder 340 may correspond to the first component of the place model $f_v$ discussed above. For example, the scene encoder 340 may correspond to the scene encoder p discussed above. In embodiments, the scene module 330 may be referred to as a NeRF renderer. The scene module 330 may receive as input one or more RGB images of the scene 104, and may output a NeRF model of the scene 104, as discussed above. The scene encoder 340 may receive as input the NeRF model and a sample viewing direction, for example the viewing direction d discussed above, and may output scene encoding corresponding to the viewing direction. In embodiments, the scene encoder 340 may be an artificial intelligence or machine learning model such as a neural network model, and the scene encoding may be a feature vector.

In embodiments, the affordance decoder 350 may correspond to the third component of the place model $f_v$ discussed above. In embodiments, the affordance decoder 350 may be referred to as an affordance generator. The affordance decoder 350 may receive as inputs an object encoding corresponding to a particular object orientation, and a scene encoding corresponding to a particular viewing direction, and may output an affordance map corresponding to the object orientation and the viewing direction. In embodiments, each object orientation may correspond to a proposed grasp orientation, and each viewing direction may correspond to a proposed placement direction. Therefore, each affordance map may correspond to a particular proposed grasp orientation and a particular proposed placement direction.

The affordance selection module 360 may receive as inputs a plurality of affordance maps, and may select an affordance map, from among the plurality of affordance maps, to be used for performing the pick-and-place task. The affordance selection module 360 based on affordance values associated with the affordance maps. As discussed above, each affordance map may include a plurality of pixels, and each pixel may be associated with an affordance value which may indicate a probability of success if the target object 102 is placed at the location of the pixel, according to a grasp orientation and a placement direction corresponding to the affordance map. Therefore, as an example, the affordance selection module 360 may determine a highest affordance value from among all affordance values associated with all of the plurality of affordance maps, and may select the affordance map including the highest affordance value. However, this is only an example, and embodiments are not limited thereto. For example, the affordance selection module 360 may select an affordance map that includes an affordance value which is above a predetermined threshold, and which also satisfies other conditions, for example complexity of the trajectory, grasping requirements of the target object 102, time required for the pick-and-place operation, and so on.

In embodiments, the object encoder 320, the scene encoder 340, and the affordance decoder 350 may be jointly trained. For example, the object encoder 320, the scene encoder 340, and the affordance decoder 350 may be trained together to generate affordance maps corresponding to a particular type of scene, for example a tabletop scene, a shelf scene, and so on.

Although the various modules are described above as being included in the placement proposal module, embodiments are not limited thereto. For example, the object encoder 320, the scene encoder 340, and the affordance decoder 350 may be included in an artificial intelligence module separate from the object shape module 310, the scene module 330, and the affordance selection module 360. As another example, the affordance selection module 360 may be included in the command generator 134, or may be a separate element included in the computer system 130.

Figure 4:
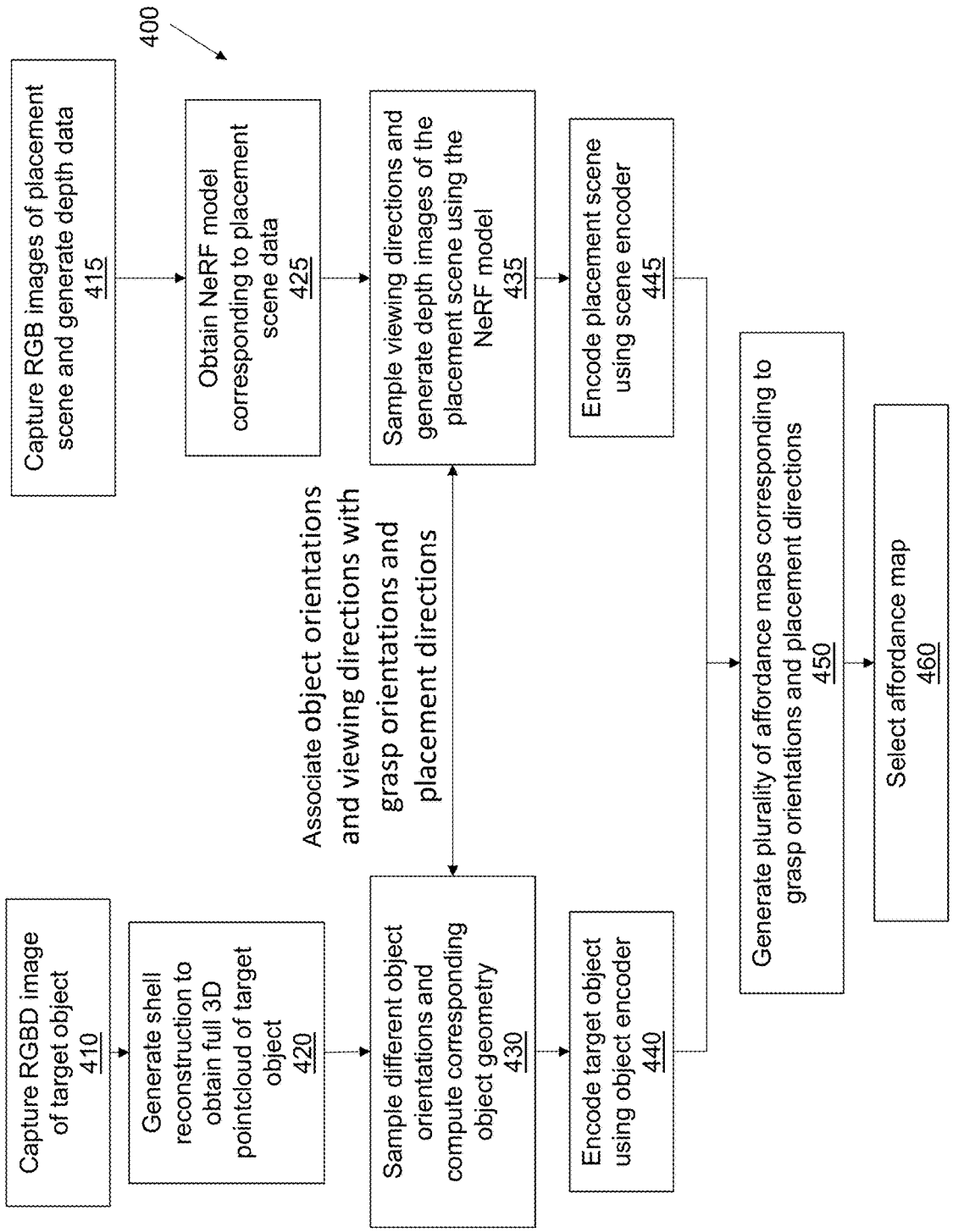
FIG. 4 illustrates a process of controlling a robot including a manipulator, according to embodiments of the present disclosure.

FIG. 4 illustrates a process of controlling a robot including a manipulator, according to embodiments of the present disclosure. In embodiments, the operations illustrated in FIG. 4 may be performed using any element described herein, for example the apparatus 100 or any element thereof.

As shown in FIG. 4, at operation 410 the process 400 may include capturing an RGBD image of the target object 102. In embodiments, operation 410 may be performed using the vision sensor 120.

At operation 420, the process 400 may include generating a shell reconstruction of the target object 102 to obtain a 3D pointcloud of the target object 102. In embodiments, operation 420 may be performed using the object shape module 310, and the 3D pointcloud may correspond to, or may be used to generate, the TSDF discussed above.

At operation 430, the process 400 may include sampling different orientations of the target object 102 and computing corresponding object geometry, and at operation 440, the process 400 may include encoding the target object 102 at the different object orientations to generate object encodings corresponding to the different object orientations. In embodiments, operation 440 may be performed using the object encoder 320.

At operation 415 the process 400 may include capturing at least one RGB image of the scene 104, and generating depth data corresponding to the scene 104. In embodiments, operation 415 may be performed using at least one of the vision sensor 120 and the image module 132.

At operation 425, the process 400 may include generating a shell reconstruction of the target object 102 to obtain a NeRF model of the target object 102. In embodiments, operation 425 may be performed using the scene module 330.

At operation 435, the process 400 may include sampling different viewing directions and depth images of the scene 104 corresponding to different viewing directions, and at operation 445, the process 400 may include encoding depth images corresponding to the different viewing directions to generate scene encodings corresponding to the different viewing directions. In embodiments, operation 440 may be performed using the scene encoder 340.

In embodiments, at operation 430 and operation 435, each object orientation and viewing direction may be associated with a grasp orientation and a placement direction.

At operation 450, the process 400 may include generating a plurality of affordance maps. In embodiments, the object encodings and the scene encodings may be cross-correlated when the plurality of affordance maps are generated. For example, as discussed above, each affordance map may correspond to a particular object encoding (and therefore a particular grasp orientation or a particular object orientation) and a particular scene encoding (and therefore a placement direction or a particular viewing direction). In embodiments, operation 450 may be performed by the affordance decoder 350.

At operation 460, the process 400 may include selecting an affordance map from among the plurality of affordance maps. As discussed above, the selected affordance map may be selected because it includes a highest affordance value from among all affordance values associated with all of the plurality of affordance maps, however embodiments are not limited thereto. In embodiments, operation 460 may be performed by the affordance selection module 360.

Figure 5:
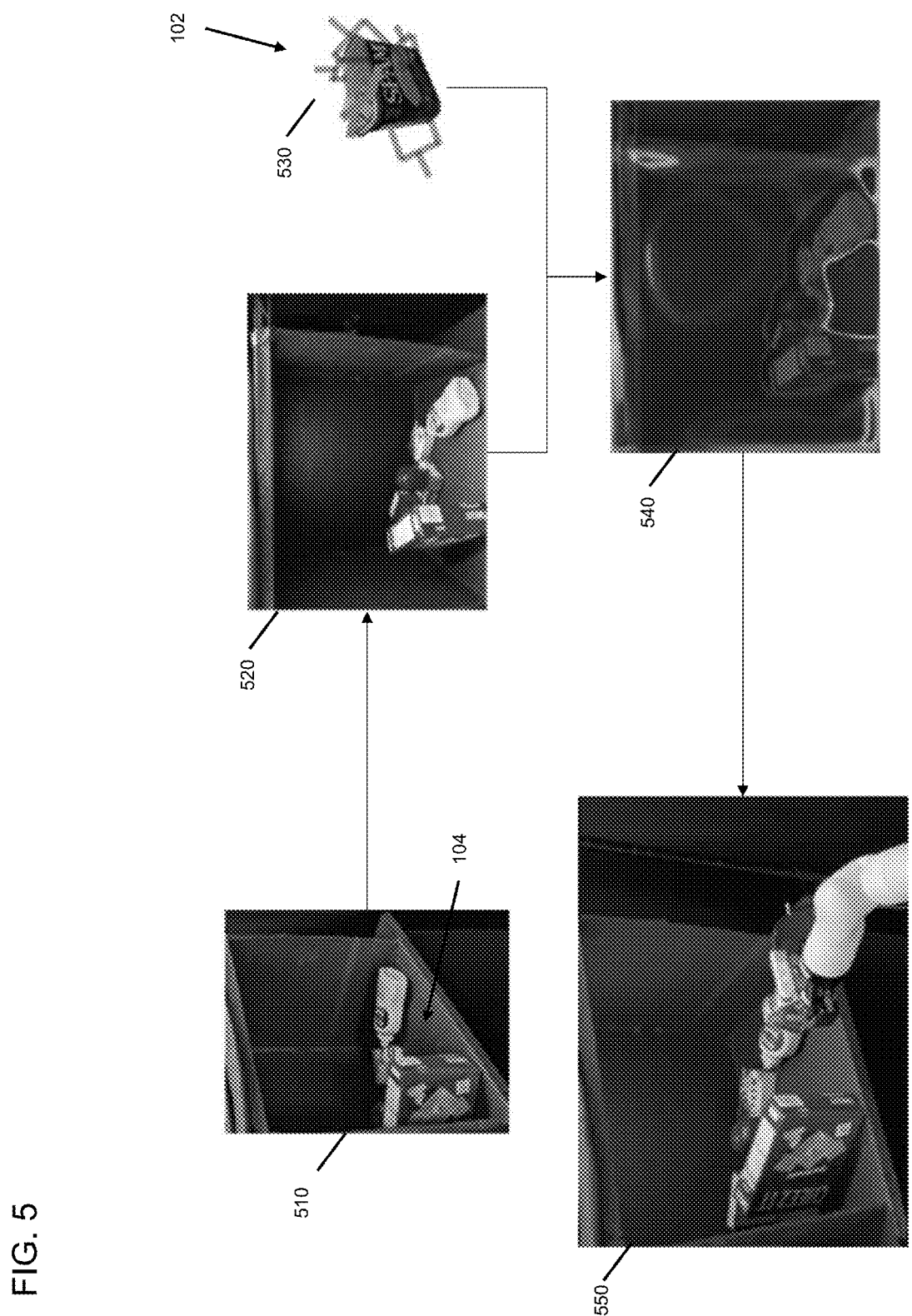
FIG. 5 illustrates example results of a process for controlling a robot including a manipulator, according to embodiments of the present disclosure.

FIG. 5 illustrates example results of a process for controlling a robot including a manipulator, according to embodiments of the present disclosure. As shown in FIG. 5, at least one RGB image 510 may be captured of a scene 104, and a NeRF rendering 520 corresponding to a particular placement direction may be generated. In addition, an RGBD image of a target object 102 may be captured, and a sampled grasp orientation of a 3D representation 530 of the target object 102 may be determined. An affordance map 540 corresponding to the grasp orientation and the placement direction may be generated, and the affordance map 540 may be used to determine a placement strategy 550 for placing the target object 102 at a location in the scene 104.

FIGS. 6A to 6D are block diagrams illustrating an example of an object shape module, according to embodiments of the present disclosure. In embodiments, the example of the object shape module of FIGS. 6A to 6D may correspond to the examples of the object shape module 310 discussed above, in that the object shape module 310 of FIGS. 6A to 6D may receive as input the RGBD image of the target object 102, and may output 3D geometry information which may be used to represent the target object 102, and which may be used by the object encoder 320 to generate object encodings. However, the object shape module 310 of FIGS. 6A to 6D may generate the 3D pointcloud differently than the examples of the object shape module 310 discussed above.

Figure 6A:
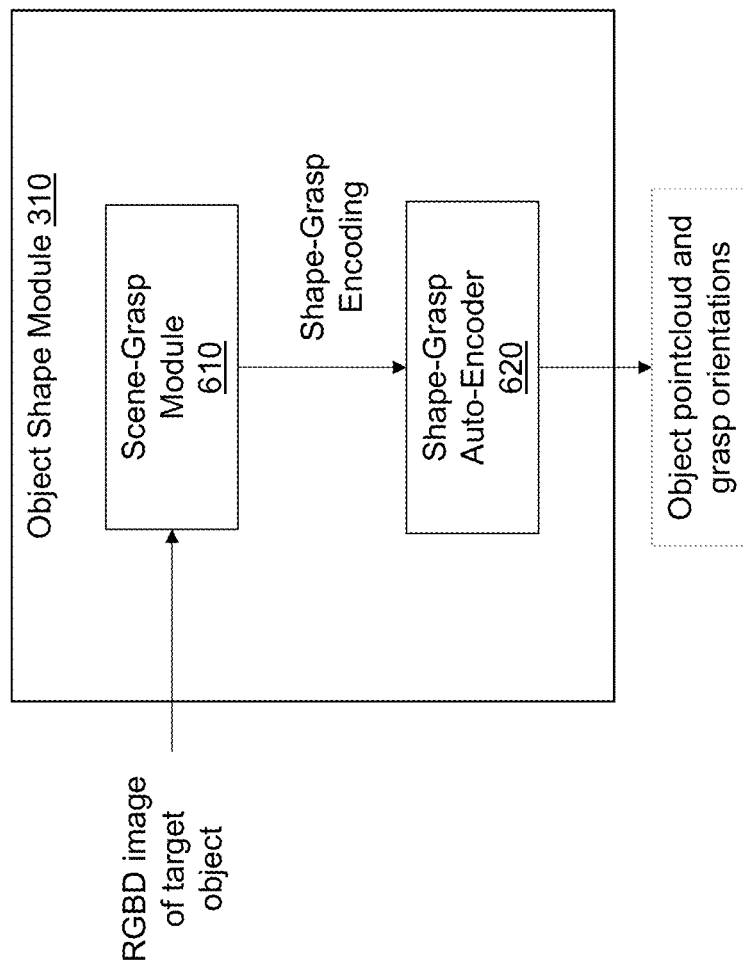
FIGS. 6A to 6D are block diagrams illustrating an example of an object shape module, according to embodiments of the present disclosure.

In embodiments, the object shape module 310 of FIG. 6A may use geometric and meta information of the target object 102, as well as feasible grasps on the target object 102, for fast inference for robotic manipulation. By jointly learning object-level scene understanding and simultaneous shape-and-grasp estimation, accurate grasps can be predicted with semantics.

Robots in environments such as homes or factories may need the capability to quickly compute grasps on the target object 102 and plan an action to use the target object 102 after grasping, for example by placing the target object 102 in a scene 104. Such fast computation may allow robots to be reactive in case the target object 102 moves or any obstacles appear in the scene during the manipulation process. In embodiments, the object shape module 310 may allow robots to simultaneously reconstruct full 3D shapes and poses of the target object 102 and generate grasp proposals, for example proposed grasp orientations, for the target object 102 based on a single image. This may allow the robot to accurately avoid collision with the target object 102 during manipulation. According to embodiments, output may be generate at a rate more than 25 frames per second (FPS), which may be useful for reactive robotic manipulation.

In embodiments, the object shape module 310 of FIG. 6A may receive as input an RGBD image of the target object 102, which may be for example in scene. In embodiments, the RGBD image may be input as an RGB image and a depth image, as shown in FIG. 6A. The object shape module 310 of FIG. 6A may output a full 3D shape, scale, and pose of all the objects in the scene as well as grasp proposals on these objects.

Figure 6B:
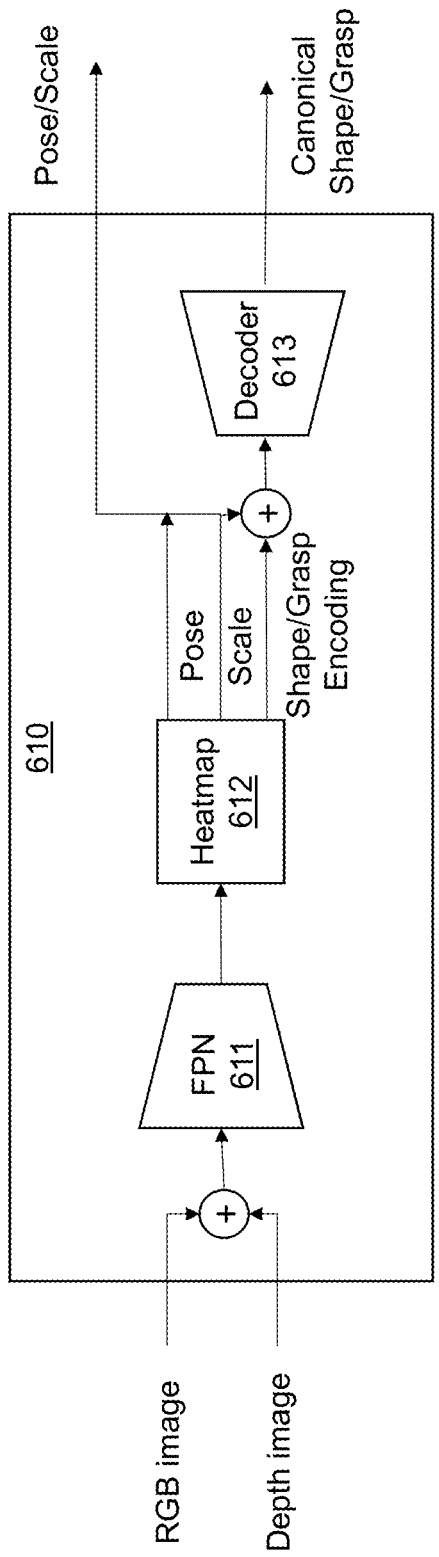

As shown in FIG. 6A, the object shape module 310 may include a scene-grasp module 610 and a shape-grasp auto-encoder 620. The scene-grasp module 610 may generate per pixel encoding which contains shape-grasp encoding corresponding to the objects, object scale, and object pose, for example based on a heatmap 612 generated using a feature pyramid network (FPN) 611 as shown in FIG. 6B. Scale and pose may be regressed from the scene-grasp module 610, and a canonical shape/grasp representation may be generated using a decoder 613. The canonical shape/grasp representation may be in unit-canonical space, which may refer to a space in which every object is centered, in a unit scale, and in canonical class orientation.

Figure 6C:
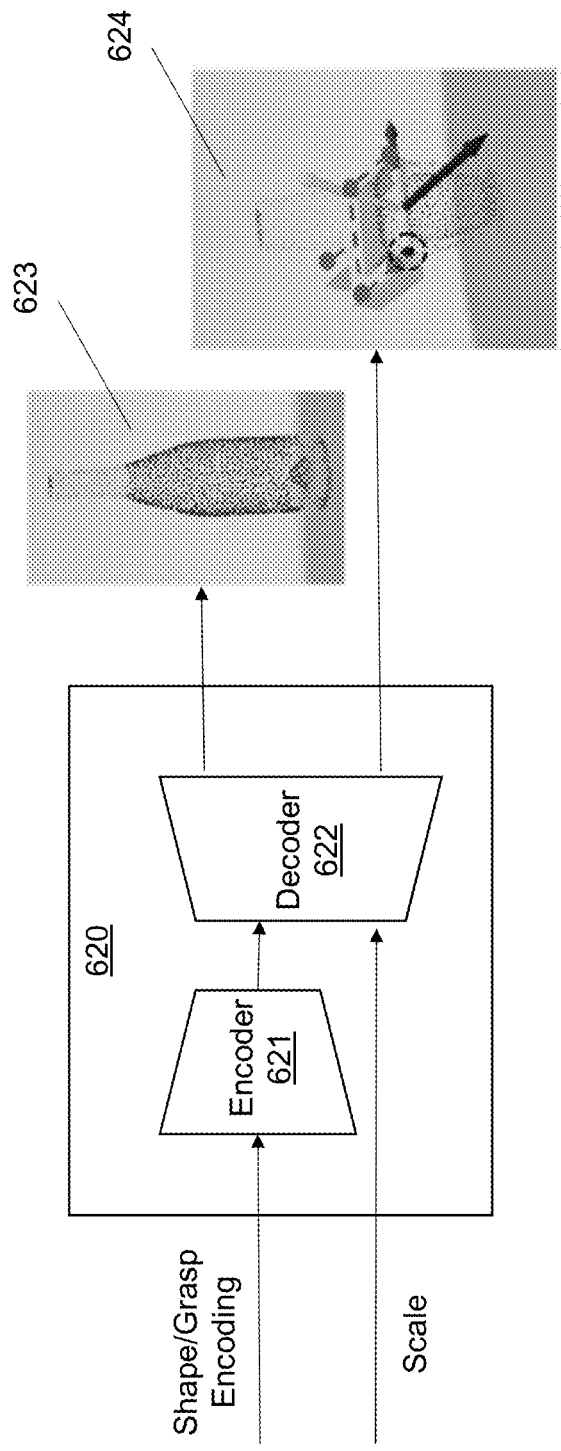

In embodiments, the shape-grasp auto-encoder 620 may be used to decode and generate the object shape and grasp proposal from the embeddings. In embodiments, the shape-grasp auto-encoder 620 may be trained on categories of objects to generate a 3D reconstruction, for example a 3D pointcloud, and grasp proposals on novel objects within those categories. For example, as shown in FIG. 6C the shape-grasp auto-encoder 620 may generate a grasp success probability for each point in the pointcloud 623, and a grasp pose 624 for each grasp feasible point. As shown in FIG. 6C, the darker points in the pointcloud 623 may represent the grasp-feasible points. Combining the output object shape, scale, and pose, a complete scene reconstruction may be obtained along with grasp proposals to manipulate those objects.

Task-driven robotic manipulation may involve a robot operating on specific objects in a scene and with semantic understanding. For example, a robot loading a dishwasher may place cups, bowls, dishes, and utensils in different sections and in different orientations in the dishwasher racks. To selectively grasp a bowl and load it appropriately in the dishwasher, the robot may to identify the bowl in the scene and localize it. The understanding of the full 3D geometry of the object determines when robot can grasp the object, and moreover how to place it in the task.

The semantic scene understanding, including the detailed information of the object categories, object poses, and object geometries, may play an important role in guiding the robot actions such as grasp and motion planning. However, scene understanding and action planning are often studied separately and there may be interdependence of the two.

In embodiments, detailed scene understanding and grasp action planning may be simultaneously inferred. For example, given an RGBD image of a cluttered scene, the semantic segmentation, object poses, full 3D geometries of the objects, and feasible grasps may be predicted by the object shape module 310 to allow the robot to manipulate the objects.

In embodiments, the object shape module 310 may perform object-level-scene-understanding (e.g., reconstruction and pose estimation), and dense grasp estimation for multiple objects from a single view RGBD image in a single feed-forward pass manner. Real-time object-level scene understanding and grasp prediction capabilities provided by embodiments may enable reactive task-aware object manipulation in a cluttered environment. In embodiments, a low dimensional latent space of shapes may be learned in unit-canonical space. Then, given an RGBD image, the object shape module 310 may learn to regress pose, scale and embeddings into this low dimensional feature space, which can then be combined to recover full 3D shape information. However, grasp parameter estimation may depend on the scaled geometry of the object. For example, a same object at smaller or unit scale will have different grasp parameters at a bigger scale. This combined space of shapes and scale dependent dense grasp parameter may be learned using the scale-based shape-grasp auto-encoder 620.

The scale-based shape-grasp auto-encoder 620 may be used to learn a combined latent space of shape-dependent and scale-dependent grasp parameters for the shape.

As shown in FIG. 6C, the shape-grasp auto-encoder 620 may use a pointnet-based encoder decoder architecture may be used, in which the encoder 621 takes as input the point-cloud in unit-canonical space, and outputs an embedding or encoding. The input scale may be appended to this embedding, and the appended vector may be passed to the decoder 622. The decoder 622 may include a set of fully-connected layers which may upsample the embedding dimension. This vector may then be reshaped into a tensor in which every point-vector is then processed by different heads. For example, the first three elements may be simply returned as a particular point's 3D location, and the next element may be applied with sigmoid nonlinearity and is returned as grasp-success confidence. Remaining elements may then be processed with soft-max layer and may represent one-hot grasp-width. The grasp-width bins may be uniform across a range from zero to a maximum gripper width. The final grasp-width may be the width of the max score bin. Accordingly, the grasp-width may be predicted in the original gripper scale, unlike the pointcloud which may be predicted in the unit-canonical space as input.

Training simultaneously for shape and scale dependent grasp parameter prediction may be a challenging task due to their interdependence. Moreover, because there may be no point-correspondences between predicted and ground truth point-cloud, estimating grasp-labels for loss calculation may be non-trivial. In embodiments, grasp-parameter losses may be back-propagated only when the shape predictions begin to be acceptable. To find grasp labels for predicted point-clouds, the ground-truth grasp label may be extrapolated from a point which is relatively close to the predicted point.

Figure 6D:
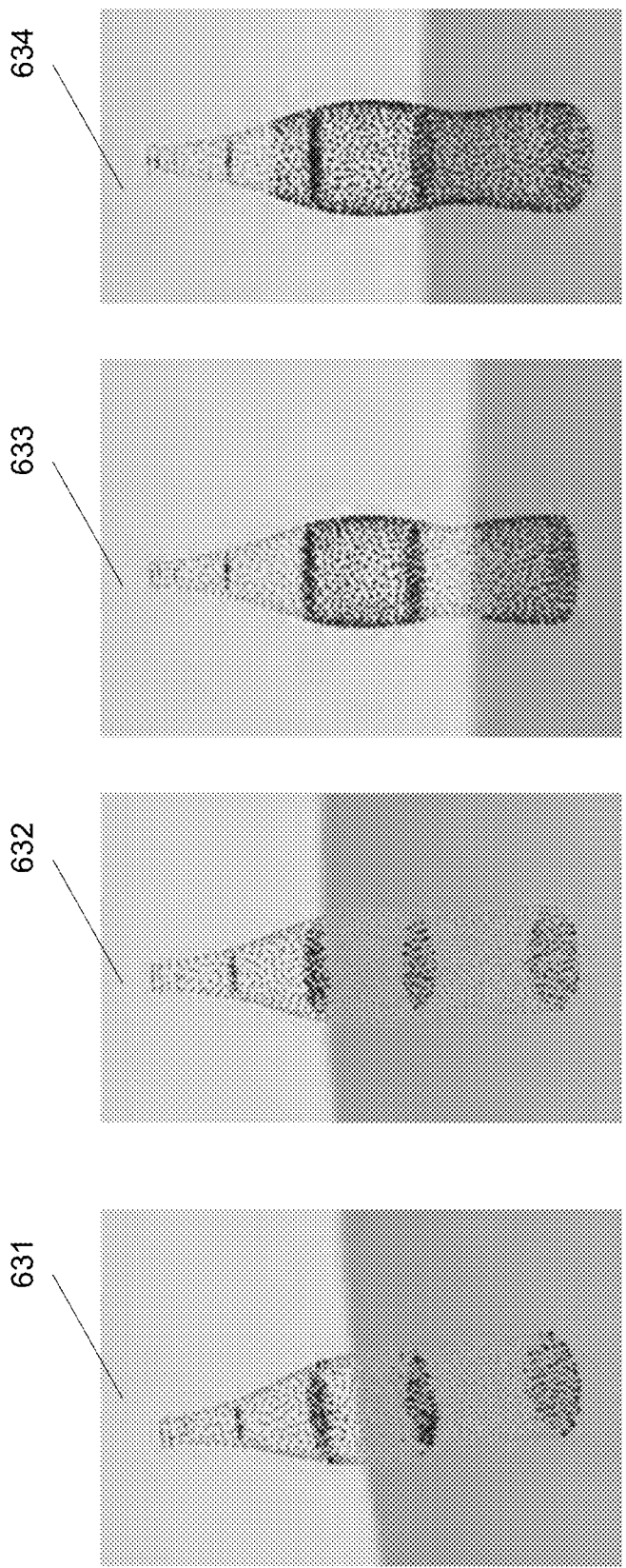

FIG. 6D shows an example of the effect of scale on grasp feasibility. In particular, FIG. 6D shows example point-clouds output by the shape-grasp auto-encoder 620, with grip-feasible points shown as darker points, and grip-infeasible points as lighter points. As can be seen in FIG. 6D, for a manipulator 112 such as a gripper having a fixed maximum width, and for target objects in an order of largest scale 631 to smallest scale 634, as the scale increases, the wider parts of target object become ungraspable due to fixed maximum width of the gripper, and only thinner parts remain graspable. Although FIG. 6D illustrates an example in which the gripper size is fixed and the scale of the target object changes, a similar effect may occur when the size of the target object is fixed and the gripper size is changed.

According to embodiments, the object shape module 310 of FIGS. 6A to 6D may provide accurate object and scene reconstruction and grasp planning based on a single image. For example, give a partial geometry of the scene as an RGBD image, the scene-grasp module 610 may generate shape-grasp embeddings which may be decoded using the shape-grasp auto-encoder 320 to generate full 3D shapes of the objects in the scene and grasp predictions for those objects. Because the object shape module 310 may estimate full 3D shapes and grasps, embodiments may avoid false positive grasps considering full 3D geometry, and may generate more accurate grasps.

Further, the object shape module 310 of FIGS. 6A to 6D may generate full 3D object shapes and object poses simultaneously. Using the object pose, all of the object reconstructions may be transformed in a single common robot frame to generate complete scene reconstruction in the robot frame. The robot frame scene reconstruction may be directly useful by the robot to execute grasps and also plan collision-free motions. The scene-grasp module 610 and the shape-grasp auto-encoder 620 may work together to simultaneously generate image segmentation, object reconstruction, object pose, and grasp proposals. For example, in embodiments the scene-grasp module 610 and the shape-grasp auto-encoder 620 may generate all of these features at 25 frames per second, which may be suitable for realtime applications.

Figure 7:
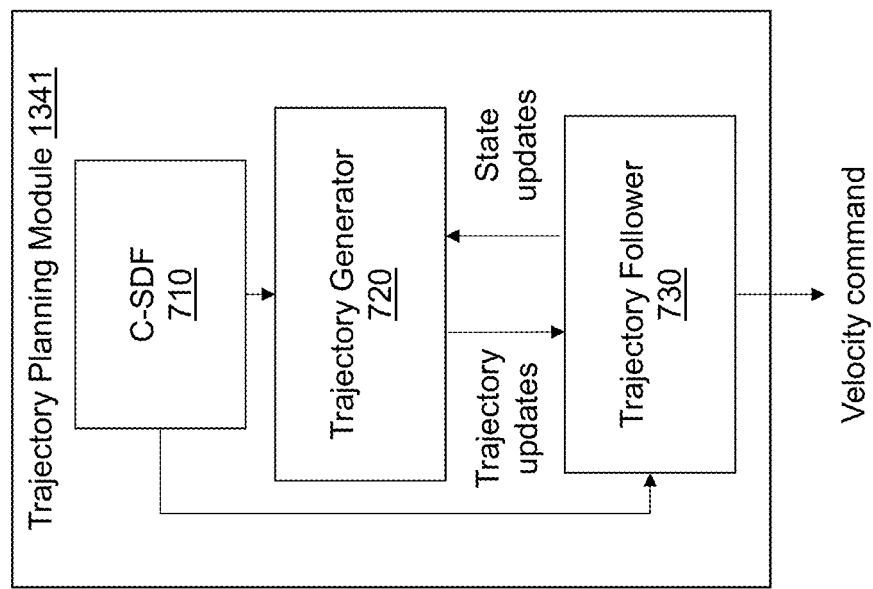
FIG. 7 is a block diagram of an example of a trajectory planning module, according to embodiments of the present disclosure.

FIG. 7 is a block diagram of an example of a trajectory planning module, according to embodiments of the present disclosure. As discussed above, after a placement direction is selected by the placement proposal module 133, the trajectory planning module 1341 may generate a proposed trajectory based on the placement direction, and the command generator 134 may use this proposed trajectory to move the manipulator 112 to place the target object 102 at a location in the scene 104. For example, the trajectory planning module 1341 may receive as input the placement direction, which may for example correspond to a goal configuration of the robot such as a current configuration of the joints 111 of the tool 110, and may also receive as input information indicating a current configuration of the robot. The trajectory planning module 1341 may output velocity commands which may be used by the motion controller 1342 to control the joints 111 in order to move the tool 110, which may cause the manipulator 112 to move the grasped target object toward a placement position in the scene 104.

In embodiments, the trajectory planning module 1341 may include two modules running in parallel and communicating asynchronously, for example a trajectory generator 720, which may operate based on Model Predictive Path Integral (MPPI) control, and proposes trajectories to a vector field-based trajectory follower 730, which may track the most recently proposed trajectory and avoid obstacles in real-time. The trajectory generator 720 and the trajectory follower 730 may use a Configuration Signed Distance Function (C-SDF) module 710, either by the trajectory generator 720 for estimating collision costs of proposed configurations during planning, or by the trajectory follower 730 for avoiding obstacles by moving along the positive direction of the C-SDF gradient as needed. In embodiments, the velocity commands from the trajectory follower may be modified to handle any desired constraints and passed to the motion controller 1342.

In general, home assistance robots with manipulation capabilities or wheeled robots navigating indoor environments need to plan motions quickly in order to work seamlessly around humans. At the same time, they may need to be safe and reactive to unexpected changes in the environment. According to embodiments, the trajectory planning module 1341 of FIG. 7 may rapidly plan for motion trajectories (for example with a rate >3 Hz), may satisfy task and robot-specific constraints (such as avoiding spills or drops), and may provide safety by reacting to static or dynamically moving obstacles.

Many approaches for robots with high-dimensional configuration spaces (e.g., manipulators) may struggle to provide fast and reliable solutions in unknown environments, due to two major challenges. First, there may be no well-established trade-off between global optimality and local reactivity and, second, the cost of collision checking may be prohibitive for real-time robot manipulators.

Two approaches for motion planning may include search-based motion planning and reactive motion planning. Variants of sampling-based, search algorithms may provide probabilistic completeness and guaranteed obstacle avoidance properties, but they may optimize for a trajectory using a full explicit map of the environment and need to plan from scratch when that map changes, resulting in slow and inefficient implementations that cannot easily adapt to environments explored online. In addition, the sequential manner in which these algorithms expand during planning makes them not suitable for parallelization and graphical processing unit (GPU) acceleration.

On the other hand, traditional purely reactive schemes, such as artificial potential fields or navigation functions, may provide fast updates and can guarantee safety against obstacles. However, they have problems with local minima. Additionally, purely reactive schemes typically need implicit representations of obstacles, which may not be straightforward to obtain in high-dimensional configuration spaces.

Model predictive control (MPC) schemes may be a middle ground between open-loop sampling-based planning and pure reactive control. MPC schemes may have the ability to incrementally account for obstacles in the environment and quickly adjust the resulting trajectory. Moreover, MPC schemes that rely on forward simulation of control inputs, such as MPPI control, may be fully parallelizable and may be implemented on a GPU, therefore dramatically decreasing planning times. However, proposed trajectories may drastically change between timesteps, producing jerky control inputs and necessitating the use of postprocessing (e.g., control input spline fitting). Also, unlike some planning methods, MPC schemes may simply encode task completion, safety or other configuration constraints as cost functions in the optimization problem, which does not necessarily guarantee their satisfaction by the resulting trajectory.

In addition, collision checking may become a major speed bottleneck of motion planning algorithms. For example, the robot may check whether each particular proposed configuration during planning is in collision with obstacles in the environment, which may be a costly operation that requires the evaluation of several low-level geometric expressions. Some approaches estimate the probability of collision with neural networks and use it within an MPC algorithm. However, this does not necessarily ensure safety against obstacles in the environment. This problem becomes worse when the task is to not only examine whether a particular configuration is in collision, but also to estimate the distance of the robot to the nearest workspace obstacle, critical for the online implementation of reactive schemes. For robotic manipulation, an algorithm that can take in robot configurations, output the distance of the robot to the closest workspace obstacle and its gradient, and use those values for fast, online reactive control would be useful.

Accordingly, the trajectory planning module 1341 according to embodiments may use a hierarchical reactive scheme for high-dimensional robot manipulators, in which a fast MPPI-based trajectory generator 720 may guide a local vector field-based trajectory follower 730 which may generate, in real-time, safe and smooth motions that respect desired configuration constraints. Implicit Signed Distance Functions (SDF) may be used for real-time reactive control, both for fast collision checking and as a well-defined implicit representation of the workspace obstacles, within the context of the trajectory generator 720 and the trajectory follower 730 respectively. For example, for a robot system with a high number of DoF performing pick-and-place tasks in complex 3D environments, the trajectory planning module 1341 illustrated in FIG. 7 may provide improved global planning and execution.

According to embodiments, the C-SDF module 710 may be a learning-based module based on i-SDF which may receive as input in the robot's current configuration and a pointcloud of the scene, which may be for example the surrounding environment of the robot, or the environment which the manipulator 112 is moving, and may output an estimate of the distance of the entire robot body to nearby obstacles, along with its gradient. Unlike some approaches in fast collision checking with neural networks which require offline training on many different scenes, the C-SDF module 710 may be trained online from incoming pointcloud measurements, and may be used either for MPC planning, as a proxy of configuration collision cost, or for online trajectory following, by using the C-SDF gradient to push the robot away from obstacles.

Unlike some approaches which use MPPI mostly as a low-level controller and requires the use of a robot model, the trajectory planning module 1341 according to embodiments may use a fast, online trajectory generator 720, which may take as input a starting robot configuration and a goal robot configuration, and may use the output of the C-SDF module 710 for estimating configuration collision costs during planning and outputs a reference trajectory for the robot to track.

The trajectory follower 730 may be a closed-form, vector field-based module which tracks the proposed trajectory from the trajectory generator 720, uses the gradient of the C-SDF module 710 for collision avoidance, and respects any provided configuration constraints (e.g., desired orientation angles of the end effector of the manipulator 112). The trajectory follower 730 may send smooth configuration-space velocity commands to the motion controller 1342.

The trajectory planning module 1341 may use learning models as functionals of SDFs. For example, trajectory planning module 1341 may use an optimization-based task and motion planning (TAMP) framework where the objectives are learned functionals of SDFs (e.g, functions that take in multiple SDFs and return a real). The SDFs may represent each object in the scene separately, while the functionals on top of them induce constraints on possible, physically plausible interactions between the objects in a trajectory optimization problem.

The input to the trajectory generator 720 may include the current robot configuration, and the output may include a proposed trajectory in the configuration space, given as a sequence of waypoints connecting the current robot configuration and the target or goal configuration, which may correspond for example to the placement direction obtained by the placement proposal module 133. The trajectory follower 730 may track the most recent proposed trajectory from the trajectory generator 720 and avoid obstacles in real-time, by generating velocity commands in the robot's configuration space. The trajectory generator 720 may asynchronously update the proposed trajectory for the trajectory follower at each MPPI planning step.

The trajectory generator 720 and the trajectory follower 730 may use estimates of the robot body's signed distance to the scene pointcloud given its current joint configuration. These values are referred to as C-SDF values, and two different methods may be used to estimate them. Because the trajectory generator 720 may need to query thousands of configurations at each planning step, the i-SDF algorithm may be modified to provide fast but more coarse C-SDF estimates. On the other hand, because the trajectory follower 730 may need to guarantee safety against obstacles and typically uses only the current robot configuration, a slower but more accurate C-SDF estimation algorithm based on direct computation of distances between the robot and the scene may be used.

Given a batch of robot configurations, the first step in rapidly estimating their C-SDF values may be to generate control points that roughly represent the robot's placement in the workspace for each configuration. To this end, a set of skeleton link frames which coincide with some of the robot's joints may be selected so that their pose in the workspace given a specific robot configuration can be easily computed using GPU-accelerated forward kinematics. Then, the locations of those frames may be linearly interpolated to obtain a set of C control points for each configuration.

After the robot grasps a particular object, for example the target object 102, and starts moving to placing position, for example a location in the scene 104, points corresponding to the target object 102 may be added to the overall list of control points, for accurate collision detection and distance estimation. To this end, assuming a known object geometry (in the form of a triangular mesh) and end effector pose during grasping, points on the surface of the target object 102 may be sampled, transformed using forward kinematics, and added to the list of control points, for each configuration.

During trajectory following, at each control timestep, only the SDF values for the control points of the current robot configuration may be queried. Hence, because safety may be the main requirement here, a slower but more accurate algorithm can be used.

The MPPI model used by the trajectory generator 720 may be given as a discrete-time, continuous-state system. Hence, at each MPPI control iteration, sequences of displacements may be sampled given a set of nominal configurations, and associated nominal displacements for a given control horizon. The sampled displacements may be clamped to ensure that they are within pre-defined magnitude limits and that they do not result in joint limit violations, and run through the model to compute the associated rollout costs. They may then be combined by exponential averaging, to compute the posterior displacements after an MPPI iteration. In embodiments, the MPPI loop may be initialized with the hypothesis that the start and goal configurations are connected by a straight line path in joint space. This path may be discretized to find intermediate waypoints and the associated displacements, which may be used to start MPPI updates. After each MPPI step, the trajectory tracked by the trajectory follower 730 may be updated with the new configuration rollout, which may be computed using the posterior displacements. Because the trajectory follower ensures safety against obstacles, the target configuration may be appended to this updated trajectory, in order to bias the search toward the goal at the next MPPI iteration. Even if the line segment is infeasible, the follower may repel against any obstacles in the environment, while waiting for an updated, collision-free trajectory from the trajectory generator.

The cost function for each displacement rollout may be the sum of two terms, a running cost and a terminal cost. The running cost may penalize the total length of the trajectory, as well as collisions with the environment and self-collisions at each step of the horizon.

Some MPC schemes may execute the first n steps in the control sequence and then re-plan. The optimization problem may be warm-started by "shifting" the last computed control sequence. This would imply stopping to re-plan after navigating to the n-th waypoint of the proposed trajectory rollout. This approach may result in non-smooth motions, with many intermediate stops.

In contrast, according to embodiments, the trajectory follower 730 may track the last proposed trajectory, run MPPI asynchronously, and simply update the trajectory for the trajectory follower after each MPPI iteration. Accordingly, embodiments may use a new scheme for MPC "shifting" to warm-start the next MPPI iteration, because it is not guaranteed that the robot will be exactly at the n-th waypoint of the followed trajectory after some time.

To this end, before starting the next MPPI iteration, the configuration state of the robot may be determined and the closest point to the previously proposed trajectory may be found. A new trajectory hypothesis for MPPI may be established by discarding all waypoints that precede, connecting the current configuration state with the closest point to the previously proposed trajectory, and continuing the previously proposed trajectory from this point.

This trajectory may be discretized based on a desired distance threshold between nominal waypoints and establishing nominal displacements. It should be noted that this results in a variable MPPI horizon between different MPPI control iterations, which may depend on the length of each trajectory hypothesis. This may be another benefit of the modified MPPI scheme according to embodiments: intuitively, horizons may be no longer needed, and, therefore, more computation when the robot is far from the goal configuration, and vice versa.

Given a configuration-space trajectory from the trajectory generator 720 as a sequence of waypoints, the objective of the vector field-based trajectory follower 730 may be to generate joint velocity commands that track the provided trajectory while avoiding obstacles in the environment.

Accordingly, the example of the trajectory planning module 1341 may provide a C-SDF module 710 which may take in the robot's configuration and the scene's pointcloud, and may output an estimate of the distance of the entire robot body to nearby obstacles, along with its gradient, in real-time. This may be used either for MPC planning, as a proxy of configuration collision cost, or for online trajectory following, by using the C-SDF gradient to push the robot away from obstacles and ensuring safety. Accordingly, the trajectory planning module 1341 may provide the ability to parallelize direct distance queries on a GPU, which may enable embodiments to run in real-time.

Further, the trajectory planning module 1341 may provide an MPPI-based trajectory generator 720, which may take in a starting robot configuration and a goal robot configuration, may use the C-SDF module 710 for estimating configuration collision costs during planning, and may output a reference trajectory for the robot to track, which guides the reactive trajectory follower away from local minima.

In addition, the trajectory planning module 1341 may provide an online vector field-based trajectory follower 730, which may be a closed-form module which may track the proposed trajectory from the trajectory generator 720, may use the gradient of the C-SDF module 710 for collision avoidance, may respect any provided constraints (e.g., maintaining orientation of the end effector to avoid spills or drops), and may send smooth joint velocity commands to the robot in real-time.

Figure 8:
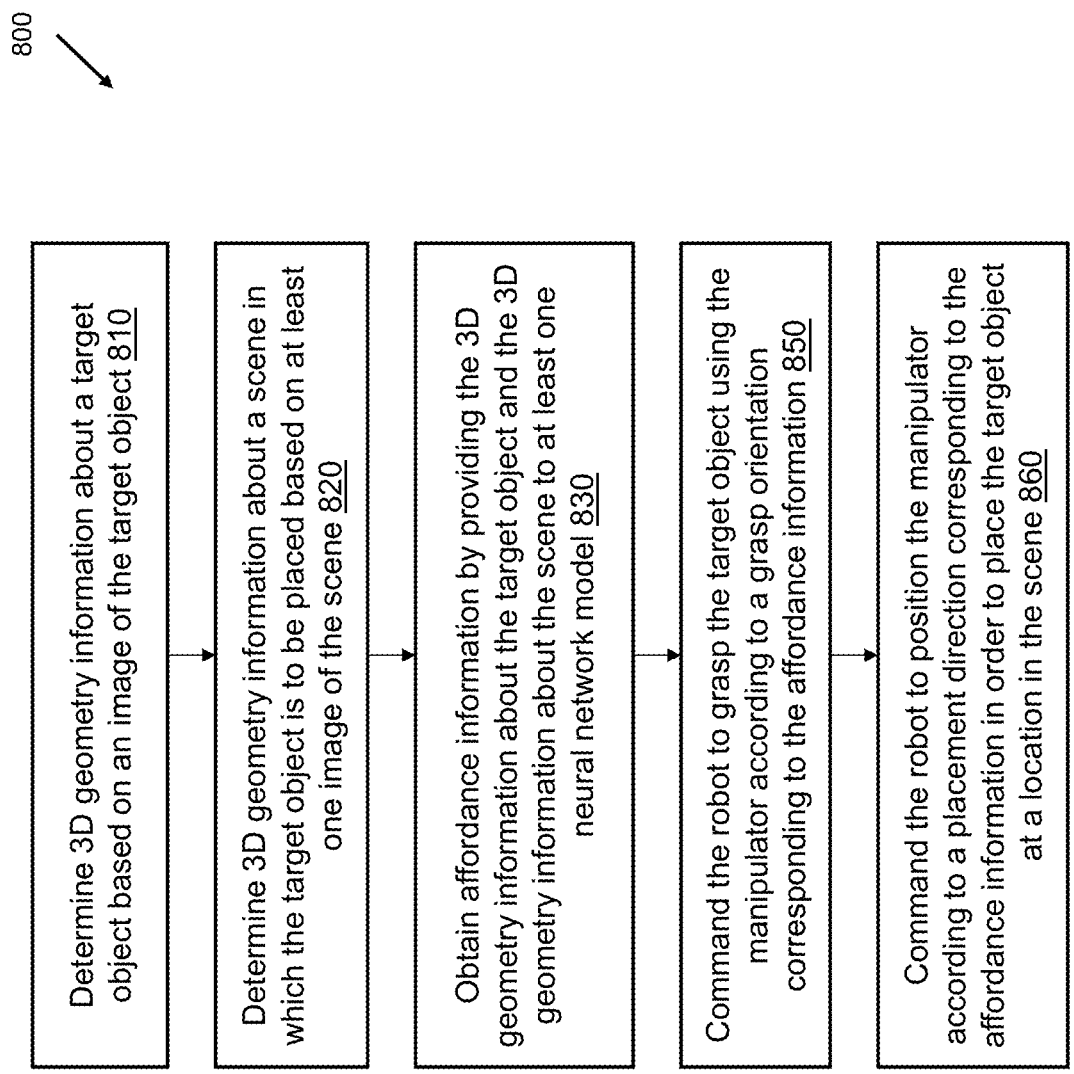
FIG. 8 illustrates a process of controlling a robot including a manipulator, according to embodiments of the present disclosure.

FIG. 8 illustrates a process of controlling a robot including a manipulator, according to embodiments of the present disclosure. In embodiments, the operations illustrated in FIG. 8 may be performed using any element described herein, for example the apparatus 100 or any element thereof. In embodiments, the manipulator may correspond to the manipulator 112.

At operation 810, the process 800 may include determining 3D geometry information about a target object based on an image of the target object. In embodiments, the target object may correspond to the target object 102 discussed above. In embodiments, the 3D geometry information may correspond to at least one of the shell reconstruction of the target object 102, the TSDF of the shell 102, and the pointcloud associated with the target object 102, as discussed above.

At operation 820, the process 800 may include determining 3D geometry information about a scene in which the target object is to be placed based on at least one image of the scene. In embodiments, the scene may correspond to the scene 104 discussed above. In embodiments, the 3D geometry information may correspond to the NeRF model associated with the scene 104, or other information about the scene 104 as discussed above.

At operation 830, the process 800 may include obtaining affordance information by providing the 3D geometry information about the target object and the 3D geometry information about the scene to at least one neural network model.

At operation 840, the process 800 may include commanding the robot to grasp the target object using the manipulator according to a grasp orientation corresponding to the affordance information.

At operation 850, the process 800 may include commanding the robot to position the manipulator according to a placement direction corresponding to the affordance information in order to place the target object at a location in the scene.

In embodiments, the process 800 may further include determining a plurality of candidate grasp orientations for grasping the target object based on the 3D geometry information about the target object; determining a plurality of candidate placement directions for placing the target object in the scene based on the 3D geometry information about the scene; and obtaining a plurality of affordance maps by providing information about the plurality of candidate grasp orientations and information about the plurality of candidate placement directions to the at least one neural network model, wherein each affordance map from among the plurality of affordance maps corresponds to a candidate grasp orientation from among the plurality of candidate grasp orientations and a candidate placement direction from among the plurality of candidate placement directions; and selecting an affordance map from among the plurality of affordance maps, and the affordance information may correspond to the selected affordance map.

In embodiments, the at least one neural network model may include an object encoder configured to output a plurality of object encodings corresponding to the plurality of candidate grasp orientations based on the 3D geometry information about the target object; a scene encoder configured to output a plurality of scene encodings corresponding to the plurality of candidate placement directions based on the 3D geometry information about the scene; and an affordance decoder configured to output the plurality of affordance maps based on the plurality of object encodings and the plurality of scene encodings. In embodiments, the object encoder may correspond to the object encoder 320, the scene encoder may correspond to the scene encoder 340, and the affordance decoder may correspond to the affordance decoder 350.

In embodiments, the object encoder, the scene encoder, and the affordance decoder may be jointly trained.

In embodiments, the affordance map may include a plurality of pixels corresponding to a plurality of affordance values, and each affordance value from among the plurality of affordance values indicates a probability of success for placing the target object.

In embodiments, the affordance map may be selected based on the plurality of pixels including a highest affordance value from among all affordance values associated with the plurality of affordance maps.

In embodiments, the process 800 may further include capturing the image of the target object and the at least one image of the scene.

In embodiments, the image of the target object may be a depth image, and wherein at least one image of the scene may be a color image.

In embodiments, the commanding the robot to position the manipulator may include computing a proposed trajectory based on the placement direction, and generating a velocity command corresponding to the proposed trajectory.

Figure 9:
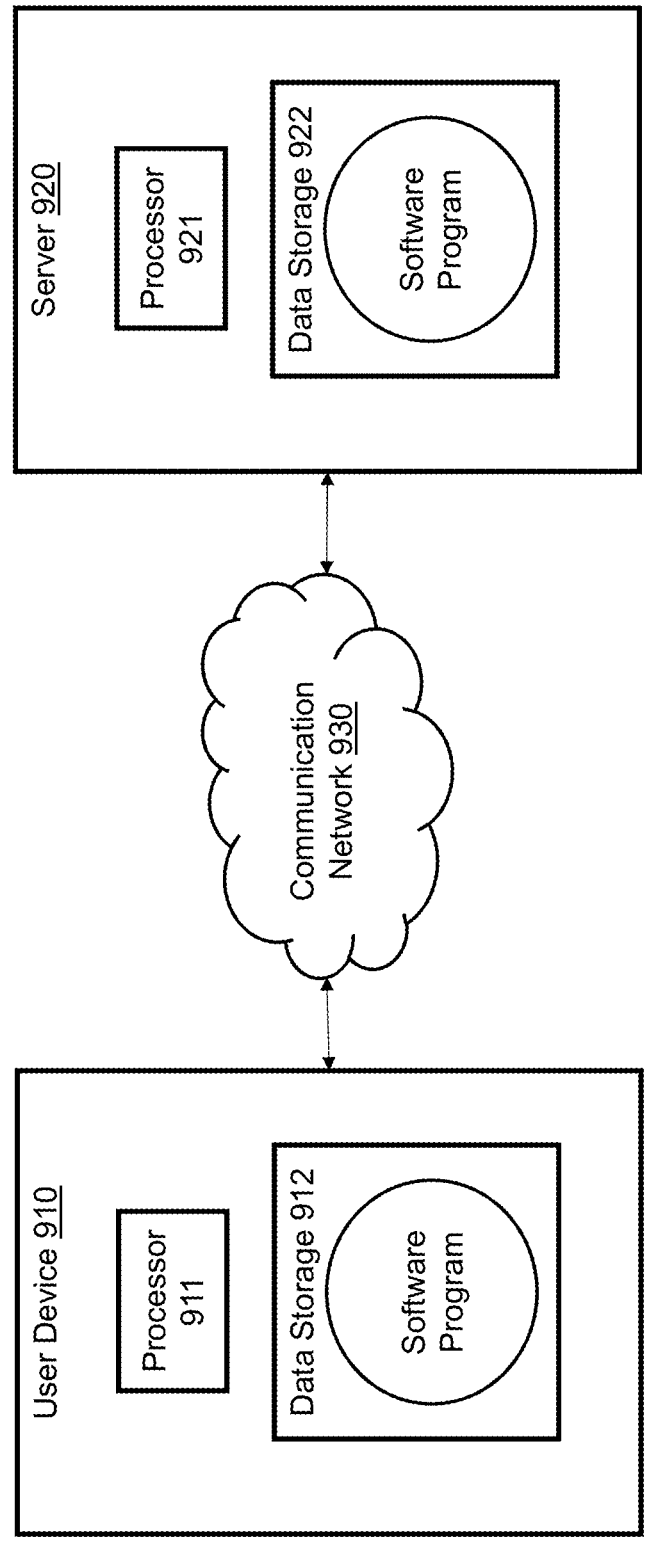
FIG. 9 is a diagram of devices for according to embodiments of the present disclosure.

FIG. 9 is a diagram of devices for controlling a robot including a manipulator, according to embodiments. FIG. 9 includes a user device 910, a server 920, and a communication network 930. The user device 910 and the server 920 may interconnect via wired connections, wireless connections, or a combination of wired and wireless connections.

The user device 910 includes one or more devices (e.g., a processor 911 and a data storage 912) configured to retrieve an image corresponding to a search query. For example, the user device 910 may include a computing device (e.g., a desktop computer, a laptop computer, a tablet computer, a handheld computer, a smart speaker, a server, etc.), a mobile phone (e.g., a smart phone, a radiotelephone, etc.), a camera device, a wearable device (e.g., a pair of smart glasses, a smart watch, etc.), a home appliance (e.g., a robot vacuum cleaner, a smart refrigerator, etc.), or a similar device.

The server 920 includes one or more devices (e.g., a processor 921 and a data storage 922) configured to train the apparatus 100.

The communication network 930 includes one or more wired and/or wireless networks. For example, network 1300 may include a cellular network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 9 are provided as an example. In practice, there may be additional devices and/or networks, fewer devices and/or networks, different devices and/or networks, or differently arranged devices and/or networks than those shown in FIG. 9. Furthermore, two or more devices shown in FIG. 9 may be implemented within a single device, or a single device shown in FIG. 9 may be implemented as multiple, distributed devices. Additionally, or alternatively, a set of devices (e.g., one or more devices) may perform one or more functions described as being performed by another set of devices.

Figure 10:
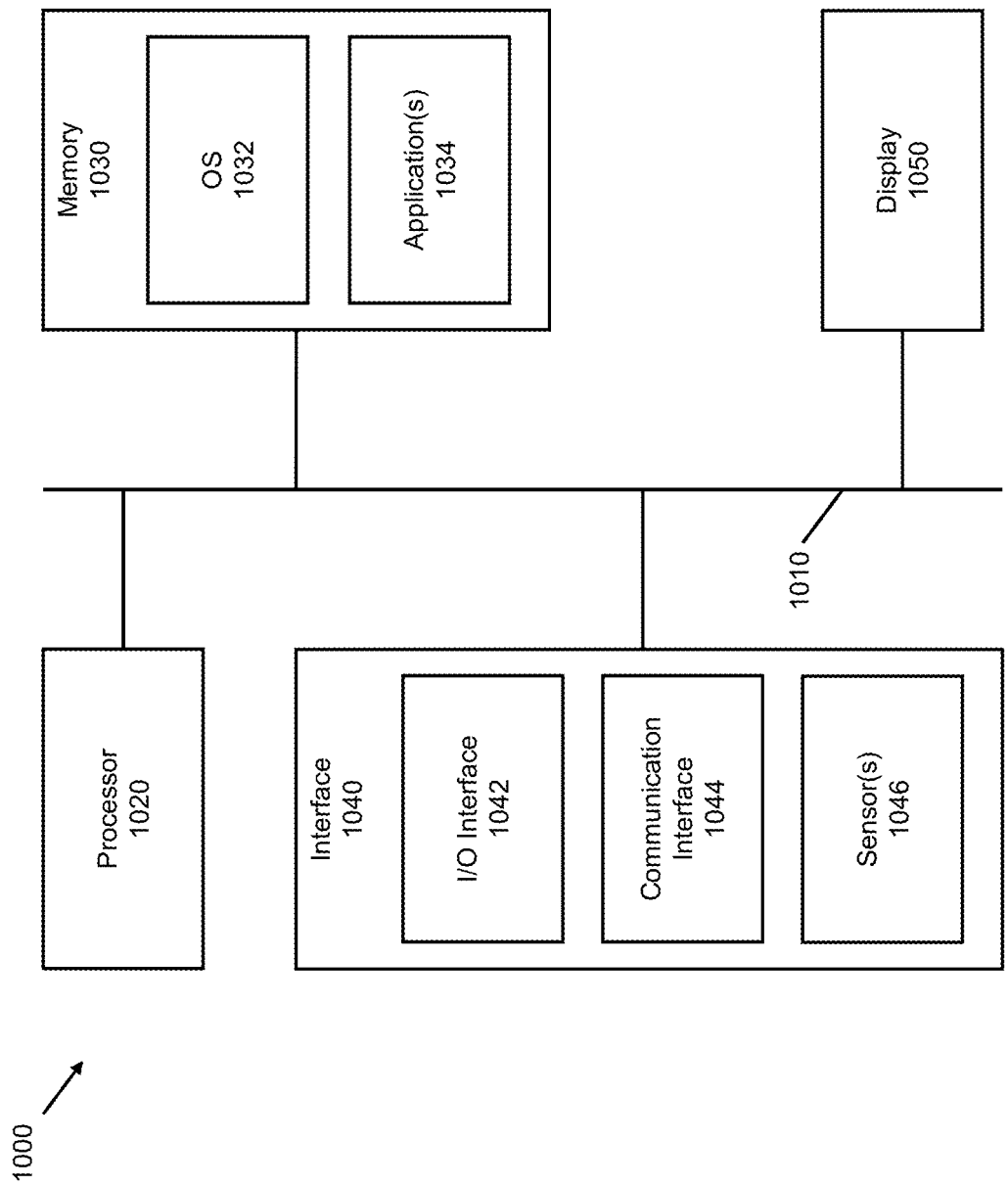
FIG. 10 is a diagram of components of one or more devices of FIG. 9 according to embodiments of the present disclosure.

FIG. 10 is a diagram of components of one or more electronic devices of FIG. 9 according to an embodiment. An electronic device 1000 in FIG. 9 may correspond to the user device 910 and/or the server 920.

FIG. 10 is for illustration only, and other embodiments of the electronic device 1000 could be used without departing from the scope of this disclosure. For example, the electronic device 1000 may correspond to a client device or a server.

The electronic device 1000 includes a bus 1010, a processor 1020, a memory 1030, an interface 1040, and a display 1050.

The bus 1010 includes a circuit for connecting the components 1020 to 1050 with one another. The bus 1010 functions as a communication system for transferring data between the components 1020 to 1050 or between electronic devices.

The processor 1020 includes one or more of a central processing unit (CPU), a graphics processor unit (GPU), an accelerated processing unit (APU), a many integrated core (MIC), a field-programmable gate array (FPGA), or a digital signal processor (DSP). The processor 1020 is able to perform control of any one or any combination of the other components of the electronic device 1000, and/or perform an operation or data processing relating to communication. For example, the processor 1020 may perform the processes 200, 400, and 800 illustrated in FIGS. 2, 4, and 8 based on a search query and a plurality of input images. The processor 1020 executes one or more programs stored in the memory 1030.

The memory 1030 may include a volatile and/or non-volatile memory. The memory 1030 stores information, such as one or more of commands, data, programs (one or more instructions), applications 1034, etc., which are related to at least one other component of the electronic device 1000 and for driving and controlling the electronic device 1000. For example, commands and/or data may formulate an operating system (OS) 1032. Information stored in the memory 1030 may be executed by the processor 1020.

The applications 1034 include the above-discussed embodiments. These functions can be performed by a single application or by multiple applications that each carry out one or more of these functions. For example, the applications 1034 may include an artificial intelligence (AI) model for performing the processes 200, 400, and 800 illustrated in FIGS. 2, 4, and 8.

The display 1050 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 1050 can also be a depth-aware display, such as a multi-focal display. The display 1050 is able to present, for example, various contents, such as text, images, videos, icons, and symbols.

The interface 1040 includes input/output (I/O) interface 1042, communication interface 1044, and/or one or more sensors 1046. The I/O interface 1042 serves as an interface that can, for example, transfer commands and/or data between a user and/or other external devices and other component(s) of the electronic device 1000.

The communication interface 1044 may enable communication between the electronic device 1000 and other external devices, via a wired connection, a wireless connection, or a combination of wired and wireless connections. The communication interface 1044 may permit the electronic device 1000 to receive information from another device and/or provide information to another device. For example, the communication interface 1044 may include an Ethernet interface, an optical interface, a coaxial interface, an infrared interface, a radio frequency (RF) interface, a universal serial bus (USB) interface, a Wi-Fi interface, a cellular network interface, or the like. The communication interface 1044 may receive videos and/or video frames from an external device, such as a server.

The sensor(s) 1046 of the interface 1040 can meter a physical quantity or detect an activation state of the electronic device 1000 and convert metered or detected information into an electrical signal. For example, the sensor(s) 1046 can include one or more cameras or other imaging sensors for capturing images of scenes. The sensor(s) 1046 can also include any one or any combination of a microphone, a keyboard, a mouse, and one or more buttons for touch input. The sensor(s) 1046 can further include an inertial measurement unit. In addition, the sensor(s) 1046 can include a control circuit for controlling at least one of the sensors included herein. Any of these sensor(s) 1046 can be located within or coupled to the electronic device 1000. The sensor(s) 1046 may receive a text and/or a voice signal that contains one or more queries.

The process for controlling a robot including a manipulator may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to apparatus 100, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The process for controlling a robot including a manipulator may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of server 106.

The foregoing disclosure provides illustration and description, but is not intended to be exhaustive or to limit the implementation to the precise form disclosed. Modifications and variations are possible in light of the above disclosure or may be acquired from practice of the implementation.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

A model related to the neural networks described above may be implemented via a software module. When the model is implemented via a software module (for example, a program module including instructions), the model may be stored in a computer-readable recording medium.

Also, the model may be a part of the electronic device 1000 described above by being integrated in a form of a hardware chip. For example, the model may be manufactured in a form of a dedicated hardware chip for artificial intelligence, or may be manufactured as a part of an existing general-purpose processor (for example, a CPU or application processor) or a graphic-dedicated processor (for example a GPU).

Also, the model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

As discussed above, embodiments may provide an algorithm that leverages the synergies between grasping and placing to perform placement-aware grasp estimation. This algorithm may operate on a high dimensional action space to find a set of placements which implicitly encode grasps. Sampling from such an action space may increase the chances for finding suitable grasping solutions. To learn from this action space, embodiments may use object-centric perspective spatial action maps, which may be referred to as affordance maps, and which may provide spatial alignments between actions and observations. This representation may also allow for learning from continuous action space, and may not require sacrificing information by discretizing it. Diverse solutions with different object orientations and placement directions may allow the robot to optimize the grasping and placement strategy under the constraints imposed by the robot kinematics and scene geometry. Accordingly, embodiments may allow a robot to complete object placement tasks with over 85% accuracy.

Embodiments may provide an object-centric action space which may match the geometry of an object to a scene for a 6DoF pick-and-place task. This action space may provide one-to-one mapping from placement actions to picking actions, and therefore may allow for estimating task performance of a grasp. Accordingly, embodiments may provide placement-aware grasp planning which may allow robot or other electronic devices to effectively grasp objects and use them for a desired task, even in novel scenarios with high degrees of freedom. Such an object rearrangement skill may be useful in allow robots to assist with day-to-day tasks, and in unstructured settings.

While the embodiments of the disclosure have been described with reference to the figures, it will be understood by those of ordinary skill in the art that various changes in form and details may be made therein without departing from the spirit and scope as defined by the following claims.

What is claimed is:

1. An electronic device for controlling a robot including a manipulator, the electronic device comprising:
   one or more processors configured to:
      determine three-dimensional (3D) geometry information about a target object based on an image of the target object;
      determine 3D geometry information about a scene in which the target object is to be placed based on at least one image of the scene;
      determine a plurality of candidate placement directions for placing the target object in the scene based on the 3D geometry information about the scene;
      obtain affordance information by providing the 3D geometry information about the target object and information about the plurality of candidate placement directions to at least one neural network model;
      command the robot to grasp the target object using the manipulator according to a grasp orientation corresponding to the affordance information; and
      command the robot to position the manipulator according to a placement direction corresponding to the affordance information in order to place the target object at a location in the scene.

2. The electronic device of claim 1, wherein the one or more processors are further configured to:
   determine a plurality of candidate grasp orientations for grasping the target object based on the 3D geometry information about the target object;
   obtain a plurality of affordance maps by providing information about the plurality of candidate grasp orientations and the information about the plurality of candidate placement directions to the at least one neural network model, wherein each affordance map from among the plurality of affordance maps corresponds to a candidate grasp orientation from among the plurality of candidate grasp orientations and a candidate placement direction from among the plurality of candidate placement directions; and
   select an affordance map from among the plurality of affordance maps, wherein the affordance information corresponds to the selected affordance map.

3. The electronic device of claim 2, wherein the at least one neural network model comprises:
   an object encoder configured to output a plurality of object encodings corresponding to the plurality of candidate grasp orientations based on the 3D geometry information about the target object;
   a scene encoder configured to output a plurality of scene encodings corresponding to the plurality of candidate placement directions based on the 3D geometry information about the scene; and
   an affordance decoder configured to output the plurality of affordance maps based on the plurality of object encodings and the plurality of scene encodings.

4. The electronic device of claim 3, wherein the object encoder, the scene encoder, and the affordance decoder are jointly trained.

5. The electronic device of claim 2, wherein the affordance map comprises a plurality of pixels corresponding to a plurality of affordance values, and
   wherein each affordance value from among the plurality of affordance values indicates a probability of success for placing the target object.

6. The electronic device of claim 5, wherein the affordance map is selected based on the plurality of pixels including a highest affordance value from among all affordance values associated with the plurality of affordance maps.

7. The electronic device of claim 1, further comprising at least one camera configured to capture the image of the target object and the at least one image of the scene.

8. The electronic device of claim 7, wherein the image of the target object is a depth image, and
   wherein the at least one image of the scene is a color image.

9. The electronic device of claim 1, wherein the one or more processors are configured to command the robot to position the manipulator by computing a proposed trajectory based on the placement direction, and generating a velocity command corresponding to the proposed trajectory.

10. A method for controlling a robot including a manipulator, the method comprising:
   determining three-dimensional (3D) geometry information about a target object based on an image of the target object;
   determining 3D geometry information about a scene in which the target object is to be placed based on at least one image of the scene;
   determining a plurality of candidate placement directions for placing the target object in the scene based on the 3D geometry information about the scene;
   obtaining affordance information by providing the 3D geometry information about the target object and information about the plurality of candidate placement directions to at least one neural network model;
   commanding the robot to grasp the target object using the manipulator according to a grasp orientation corresponding to the affordance information; and
   commanding the robot to position the manipulator according to a placement direction corresponding to the affordance information in order to place the target object at a location in the scene.

11. The method of claim 10, further comprising:
determining a plurality of candidate grasp orientations for grasping the target object based on the 3D geometry information about the target object;
obtaining a plurality of affordance maps by providing information about the plurality of candidate grasp orientations and the information about the plurality of candidate placement directions to the at least one neural network model, wherein each affordance map from among the plurality of affordance maps corresponds to a candidate grasp orientation from among the plurality of candidate grasp orientations and a candidate placement direction from among the plurality of candidate placement directions; and
selecting an affordance map from among the plurality of affordance maps,
wherein the affordance information corresponds to the selected affordance map.

12. The method of claim 11, wherein the at least one neural network model comprises:
an object encoder configured to output a plurality of object encodings corresponding to the plurality of candidate grasp orientations based on the 3D geometry information about the target object;
a scene encoder configured to output a plurality of scene encodings corresponding to the plurality of candidate placement directions based on the 3D geometry information about the scene; and
an affordance decoder configured to output the plurality of affordance maps based on the plurality of object encodings and the plurality of scene encodings.

13. The method of claim 12, wherein the object encoder, the scene encoder, and the affordance decoder are jointly trained.

14. The method of claim 11, wherein the affordance map comprises a plurality of pixels corresponding to a plurality of affordance values, and
wherein each affordance value from among the plurality of affordance values indicates a probability of success for placing the target object.

15. The method of claim 14, wherein the affordance map is selected based on the plurality of pixels including a highest affordance value from among all affordance values associated with the plurality of affordance maps.

16. The method of claim 10, further comprising capturing the image of the target object and the at least one image of the scene.

17. The method of claim 16, wherein the image of the target object is a depth image, and
wherein the at least one image of the scene is a color image.

18. The method of claim 10, wherein the commanding the robot to position the manipulator comprises computing a proposed trajectory based on the placement direction, and generating a velocity command corresponding to the proposed trajectory.

19. A non-transitory computer-readable medium configured to store instructions which, when executed by at least one processor of a device for controlling a robot including a manipulator, cause the at least one processor to:
determine three-dimensional (3D) geometry information about a target object based on an image of the target object;
determine 3D geometry information about a scene in which the target object is to be placed based on at least one image of the scene;
determine a plurality of candidate placement directions for placing the target object in the scene based on the 3D geometry information about the scene;
obtain affordance information by providing the 3D geometry information about the target object and information about the plurality of candidate placement directions to at least one neural network model;
command the robot to grasp the target object using the manipulator according to a grasp orientation corresponding to the affordance information; and
command the robot to position the manipulator according to a placement direction corresponding to the affordance information in order to place the target object at a location in the scene.

20. The non-transitory computer-readable medium of claim 19, the instructions further cause the at least one processor to:
determine a plurality of candidate grasp orientations for grasping the target object based on the 3D geometry information about the target object; and
obtain a plurality of affordance maps by providing information about the plurality of candidate grasp orientations and the information about the plurality of candidate placement directions to the at least one neural network model, wherein each affordance map from among the plurality of affordance maps corresponds to a candidate grasp orientation from among the plurality of candidate grasp orientations and a candidate placement direction from among the plurality of candidate placement directions; and
select an affordance map from among the plurality of affordance maps,
wherein the affordance information corresponds to the selected affordance map.

* * * * *